United States Patent [19]
Tsuda et al.

[11] Patent Number: 6,044,445
[45] Date of Patent: Mar. 28, 2000

[54] DATA TRANSFER METHOD AND MEMORY MANAGEMENT SYSTEM UTILIZING ACCESS CONTROL INFORMATION TO CHANGE MAPPING BETWEEN PHYSICAL AND VIRTUAL PAGES FOR IMPROVED DATA TRANSFER EFFICIENCY

[75] Inventors: Yoshiyuki Tsuda; Akira Nakamura; Toshio Okamoto, all of Tokyo, Japan

[73] Assignee: Kabushiki Kaisha Toshiba, Kawasaki, Japan

[21] Appl. No.: 08/672,370

[22] Filed: Jun. 28, 1996

[30] Foreign Application Priority Data

Jun. 30, 1995 [JP] Japan ................................. 7-166657
Jan. 26, 1996 [JP] Japan ................................. 8-012021

[51] Int. Cl.[7] .......................... G06F 12/10; G06F 13/00; G06F 12/14
[52] U.S. Cl. ....................... 711/163; 711/152; 711/165; 711/203; 711/209
[58] Field of Search .................................. 711/165, 202, 711/203, 163, 152, 205, 206, 207, 208, 209

[56] References Cited

U.S. PATENT DOCUMENTS

| | | | |
|---|---|---|---|
| 4,393,443 | 7/1983 | Lewis ........................................ | 711/207 |
| 5,446,903 | 8/1995 | Abraham et al. ........................ | 710/240 |
| 5,548,731 | 8/1996 | Chang et al. ............................ | 710/100 |
| 5,584,023 | 12/1996 | Hsu ......................................... | 707/204 |
| 5,627,987 | 5/1997 | Nozue et al. ............................ | 711/200 |
| 5,664,195 | 9/1997 | Chatterji .................................. | 395/712 |
| 5,717,926 | 2/1998 | Browning et al. ...................... | 709/104 |

OTHER PUBLICATIONS

H. Segawa et al., "64bit–Oriented Operating System CUBIX", Toshiba Research and Development Center (Kawasaki, Japan) Nov. 29, 1991.

S. Tzou et al., "The Performance of Message–passing Using Restricted Virtual Memory Remapping", Software—Practice and Experience, vol. 21(3), Mar. 1991, pp. 251–266.

E. Anderson et al., "The Performance of the Container Shipping I/O System", Technical Report CS95–441, Dept. of Computer Science and Engineering Univ. of California, San Diego, Aug. 1995, pp. 1–16.

Primary Examiner—Glenn Gossage
Attorney, Agent, or Firm—Foley & Lardner

[57] ABSTRACT

A data transfer method and a memory management system capable of improving a data transfer efficiency for data transfer between a device interface and a user space. A data transfer method and a memory management system capable of frame buffer, or (another) device interface, and for data transfer between processes. A data transfer from a transfer source device interface to a transfer destination user space, frame buffer, or (another) device interface is controlled according to an access control information provided in a kernel space, which indicates a permitted access with respect to a data block for the transfer source device interface. A data transfer between processes is controlled according to an access control information indicating a permitted access with respect to a physical page storing a transfer data, by changing a mapping between the physical page and a virtual page according to the access control information.

20 Claims, 24 Drawing Sheets

DATA TRANSFER METHOD AND MEMORY MANAGEMENT SYSTEM UTILIZING ACCESS CONTROL INFORMATION TO CHANGE MAPPING BETWEEN PHYSICAL AND VIRTUAL PAGES FOR IMPROVED DATA TRANSFER EFFICIENCY

BACKGROUND OF THE INVENTION

1. Field of the Invention

The present invention relates to a data transfer method for transferring data between a processor and a network interface/device such as memory or an output device, or between processes within a computer, and to a memory management system for managing data blocks to be used in the data transfer method.

2. Description of the Background Art

In the conventional OS (Operating System), data structures required for managing devices (including network interfaces, memory such as a hard disk, output device such as a display device, etc.) have been managed by the OS independently for each device. For example, in a case of displaying image data transferred from a network to a display device connected to a computer, data structures for managing a network interface and a display device are different, so that it is necessary to convert the image data from a data structure required for managing the network interface to a data structure required for managing the display device, during transfer of the image data.

Referring now to FIG. 1, a conventional method of data transfer from one device to another device will be described for an exemplary case in which the X server process displays image data transferred from a network to a display device. For details of the X server, see: Oliver Jones, "Introduction to the X Window System", Prentice-Hall, Inc., 1989.

In this case, packets from a network (not shown) are temporarily stored in a buffer 114 on a network interface 113 (path or "step" (a) of FIG. 1), and then transferred by a driver in the OS through a data bus 120 to a data structure (such as mbuf) 116 for managing the network interface which is provided within a kernel space 101 of a main memory 115 (step (b) f FIG. 1).

After an adequate protocol processing is applied by a network protocol processing module in the OS, transfer data are extracted from received packets, and these extracted transfer data are transferred through the data bus 120 to a prescribed data memory region 117 within a user space 102 of the main memory 115 (step (c) of FIG. 1). Here, the data memory region 117 is secured by either the X server or a data transfer destination process such as a client process.

Then, after a proper conversion processing is applied by the X server, the data transferred to the data memory region 117 within the user space 102 are further transferred through the data bus 120 to a data region called frame buffer 118 which is managed by the OS to display images through a display device 119 (step (d) of FIG. 1). Here, the frame buffer 118 is a bit map memory device which is a hardware element for storing image data to be displayed on a display screen.

Finally, image data stored in the frame buffer 118 are read out by a computer hardware (not shown) at an appropriate refresh rate, and transferred to the display device 119, such that the image data transferred via the network are displayed on the display device 119 (step (e) of FIG. 1).

In such a case where data are to be transferred over a plurality of devices, that is, a case of transferring data between a device interface and a user space, frame buffer, or another device interface, it has conventionally been necessary to transfer data more than once, so that there has conventionally been a problem that the data transfer efficiency is poor.

On the other hand, in the conventional OS, data storage structures are different according to types of devices, so that it is sufficient to provide a mutually exclusive control for accesses to the data storage structures by user processes. However, if the data storage structures are shared by more than one process, when a certain process made an access to a data storage structure in order to transfer data to a certain device, this data memory structure would become inaccessible for the other processes even if the accesses by the other processes are for different devices, so that there has conventionally been a problem that the data transfer efficiency is poor in this regard.

Now, there are cases in which a management mechanism called "STREAMS" is used as a data structure required for a device management, that is, a management of data blocks to be used for data transfer. The STREAMS is a management mechanism which has been developed to realize an efficient management of buffers used in processing a network protocol and data exchanges with SVR4 (System V Release 4) network interfaces. For details of a data structure and an operation in the STREAMS, see: Janet I. Egan and Thomas J. Teixeira, "Writing A UNIX Device Driver", 2nd Edition, John Wiley & Sons, inc., 1992.

FIG. 2 illustrates how this conventional STREAMS management mechanism works. As shown in FIG. 2, a top address of a region for storing transfer data is indicated by (db_base) and transfer data are to be stored starting from this (db_base), so that it is impossible to store transfer data starting from an address different from a top address.

Note that in a case of transferring packets through a network, a packet is often produced by attaching a header at a top of transfer data, so that packets can be produced efficiently if it is possible to store transfer data with some empty region at a top of the secured region and to write a header into this empty region at a time of producing packets. However, as noted above, it has been impossible to store transfer data with some empty region at a top of the region in the conventional STREAMS data structure, so that there has conventionally been a problem of a poor efficiency at a time of producing packets.

In addition, in the conventional STREAMS explained with reference to FIG. 2, a data memory region 124 to be used for storing transfer data is acquired in memory at a time of receiving packets or producing packets to be transmitted, but since this data memory region 124 is to be acquired in memory only after a request is issued, there has conventionally been a problem of a poor efficiency in acquiring this data memory region 124 on a memory.

Similarly, in the conventional STREAMS explained with reference to FIG. 2, data structures called message control blocks (msgb) 122 and data control blocks (datb) 123 are also acquired in memory according to need, but since these data structures are to be acquired in memory only after a request is issued, there has conventionally been a problem of a poor efficiency in acquiring these data structures on a memory.

Now, in the conventional OS, programs are turned into processes at times of their execution, and a management of memory space, etc., has been made in units of processes. For example, a memory management in the OS called UNIX is described in detail in: Maurice J. Bach, "The Design of the UNIX Operating System", Prentice-Hall, inc., 1986.

FIG. 3 illustrates an exemplary mapping between virtual pages and physical pages in a conventional OS such as UNIX. In FIG. 3, a virtual page "a" 304 belonging to a virtual space 301 for a process #1 is mapped into a physical page A 305 in a physical space 302 of an actual memory, while a virtual page "b" 304 belonging to a virtual space 301 for a process #2 is mapped into a physical page B 305 in a physical space 302 of an actual memory, and this mapping between virtual pages and physical pages is fixed in the conventional OS.

FIG. 4 illustrates a state of a page table 303 corresponding to the mapping between the virtual pages and the physical pages of FIG. 3. In the page table 303, a virtual page number (an upper portion of a virtual address) is used as an index, which is to be used for searching a page table entry (PTE) for storing a physical page number, etc. In a state shown in FIG. 4, the page table 303 indicates that the physical page A corresponds to the virtual page "a" and the physical page B corresponds to the virtual page "b".

FIG. 5 shows how a virtual address 316 is converted into a physical address 317 in a conventional computer. For details of a conversion from a virtual address to a physical address in microprocessors of 20 Intel, Corp. (Santa Clara, Calif., U.S.A.), see: Ross P. Nelson "Microsoft's 80386/80486 Programming Guide", 2nd Edition, Microsoft Press (Redmond, Wash., U.S.A.), 1991.

FIG. 5 indicates that the upper part of a virtual address is a virtual page number and the lower part of a virtual address is an offset address. Similarly, the upper part of a physical address is a physical page number and the lower part of a physical address is an offset address. In this case, the virtual address can be translated into the physical address by translating the virtual page number into the physical page number by a translation device 314, while using the same offset.

For this translation from the virtual page number to the physical page number, the page table 303 of FIG. 4 is to be used, but in order to make the translation processing faster, those page table entries (PTEs) which were accessed before are stored in a cache called a TLB (Translation Lookaside Buffer) 313.

Here, a method of data transfer between processes in such a conventional OS will be described for an exemplary case of UNIX.

In UNIX, a virtual space is allocated to each process, and in a case of switching the execution from one process to another process, an access protection for data stored in a device such as a memory has been realized by switching virtual spaces. Consequently, a transfer source process cannot transfer data directly to a data region managed by a transfer destination process, and a transfer destination process cannot make an access directly to transfer data in a data region managed by a transfer source process.

For this reason, it has conventionally been necessary to transfer data from one process to another process as follows. Namely, first, the transfer source process transfers the transfer data to a data region managed by the OS. Then, the transfer destination process transfers the transfer data to a data region managed by the transfer destination process itself.

As a consequence, in a case of transferring data between processes by this conventional data transfer method, the transfer data must be transferred at least twice, actually four times in a case of the data transfer via a processor, so that there has conventionally been a problem of a poor data transfer efficiency.

In addition, in the conventional data transfer method, a processing by which packets are transferred from a network to a receiving process and a processing by which a user program transmits data to a network are also plagued by poor efficiencies.

In the former processing of packet reception, when packets are received by a network interface, the received packets are transferred from the network interface board to a network buffer which is a region in a main memory that is managed by the OS. Then, these received packets stored in the network buffer are transferred to a processor for carrying out an error check calculation such as a checksum calculation in order to check whether there is any transfer error. Then, those received packets for which a transfer error is not detected are transferred via the processor to a receiving buffer managed by the transfer destination process. In this case, for the packets received by the network interface to get transferred to the transfer destination process, the data must be transferred four times, so that the data transfer efficiency has been poor.

Similarly, in the latter processing of packet transmission, in order for the user process to transmit data to the network, the user process transfers data to be transferred to a network buffer managed by the OS via a processor first. Then the transfer data are transferred to the processor in order to calculate necessary error detection data for enabling a receiving host to check whether there is any transfer error. Then, the transfer packets to which the error detection data and packet headers are attached are transferred to a network interface. In this case, for the user process to transmit packets to the network, data must be transferred four times, so that the data transfer efficiency has been poor.

Thus the conventional computer system has a problem in that a data transfer efficiency has been poor in a case of the data transfer between a device interface and a user space, a frame buffer, or another device interface, as it is necessary to repeat the data transfer many times between the both sides.

Moreover, in a case of transferring data between processes, a data transfer efficiency has been also poor conventionally, as the data must be transferred at least twice.

Furthermore, in a case of transferring data from a data region owned by the user process to a data region managed by the OS via a processor, a data transfer efficiency has been even poorer conventionally, as the data must be transferred four times.

Also, in a case of extracting the transfer data from the received packets transferred from the network, and transferring the extracted transfer data to a data region managed by the transfer destination process, a data transfer efficiency has been just as poor conventionally, as the data must be transferred four times.

In addition, in a case of producing transmission packets from data owned by the user process and transferring them to the network, a data transfer efficiency has been just as poor conventionally, as the data must be transferred four times.

SUMMARY OF THE INVENTION

It is therefore an object of the present invention to provide a data transfer method and a memory management system capable of improving a data transfer efficiency for data transfer between a device interface and a user space, frame buffer, or another device interface.

It is another object of the present invention to provide a data transfer method and a memory management system capable of improving a data transfer efficiency for data transfer between processes.

According to one aspect of the present invention there is provided a method for directly transferring data from a transfer source device interface to a transfer destination user space, frame buffer, or device interface in a computer system, comprising the steps of: referring to an access control information provided in a kernel space of the computer system, the access control information indicating a permitted access with respect to a data block of the transfer source device interface; and controlling a transfer of said data block according to the access control information referred at the referring step.

According to another aspect of the present invention there is provided a method for directly transferring data from a transfer source device interface to a transfer destination user space, frame buffer, or device interface in a computer system, comprising the steps of: referring to a first access control information and a second access control information provided in a kernel space of the computer system, the first access control information indicating a permitted access with respect to a first data block of the transfer source device interface, and the second access control information indicating a permitted access with respect to a second data block of the transfer destination user space, frame buffer, or device interface; and controlling a transfer of data from the first data block to the second data block according to the first access control information and the second access control information referred at the referring step.

According to another aspect of the present invention there is provided a method for directly transferring data from a transfer source user space, frame buffer, or device interface to a transfer destination device interface in a computer system, comprising the steps of: referring to a first access control information and a second access control information provided in a kernel space of the computer system, the first access control information indicating a permitted access with respect to a first data block of the transfer source user space, frame buffer, or device interface, and the second access control information indicating a permitted access with respect to a second data block of the transfer destination device interface; and controlling a transfer of data from the first data block to the second data block according to the first access control information and the second access control information referred at the referring step.

According to another aspect of the present invention there is provided a memory management system, comprising: a memory for storing each data block of a user space, frame buffer, or device interface, and an access control information which indicates a permitted access with respect to each data block, in correspondence; and control means for controlling access to a requested data block of the user space, frame buffer, or device interface, according to an identifier of an access requesting source which requested an access to said requested data block, and the access control information stored in the memory in correspondence to said requested data block.

According to another aspect of the present invention there is provided a method for transferring data between processes in a computer system, comprising the steps of: referring to an access control information indicating a permitted access with respect to a physical page storing a transfer data; and controlling a transfer of the transfer data by changing a mapping between the physical page and a virtual page from a previous one according to the access control information referred at the referring step.

According to another aspect of the present invention there is provided a memory management system, comprising: a memory for storing each physical page and an access control information indicating a permitted access with respect to each physical page, in correspondence, and control means for controlling access to a requested physical page by changing a mapping between said requested physical page and a virtual page from a previous one according to the access control information stored in the memory in correspondence to said requested physical page, and at least one of an identifier of a transfer source process and an identifier of a transfer destination process.

Other features and advantages of the present invention will become apparent from the following description taken in conjunction with the accompanying drawings.

DETAILED DESCRIPTION OF THE PREFERRED EMBODIMENTS

Referring now to FIG. 6 to FIG. 16, the first embodiment of a data transfer method and a memory management system according to the present invention will be described in detail.

Figure 6:
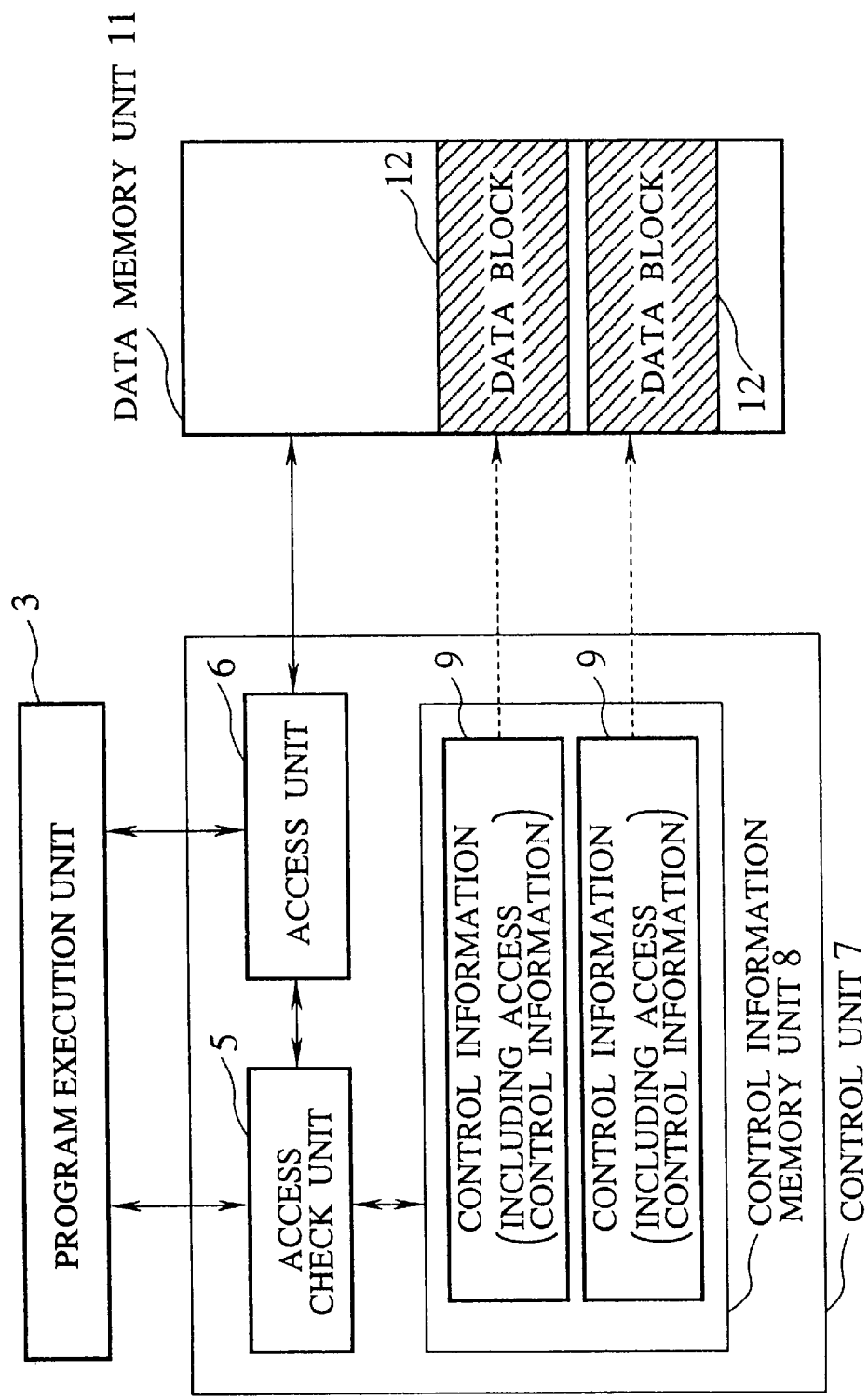
FIG. 6 is a block diagram of a memory management system according to the first embodiment of the present invention.

In this first embodiment, a memory management system has a basic configuration as shown in FIG. 6, which generally comprises a program execution unit 3, a control unit 7 connected with the program execution unit 3, and a data memory unit 11 connected with the control unit 7. The data memory unit 11 contains a plurality of data blocks 12, while the control unit 7 includes an access check unit 5, an access unit 6, and a control information memory unit 8 containing a plurality of control information 9 in 10 correspondence to the data blocks 12 of the data memory unit 11.

The program execution unit 3 is an entity which executes a user program or an entity which executes an operating system (OS) processing. In a course of individual processing, the program execution unit 3 transmits a request for access to a desired data block according to need. Here, the OS processing includes a device driver processing for controlling devices such as a network interface and a hard disk controller.

The data memory unit 11 stores the data blocks 12 which are to be used in data exchanges with other devices (not shown) associated with the system.

The data blocks 12 can be used for data exchanges between a program execution unit for a device driver and a program execution unit for a user program, or for data exchanges between a program execution unit for a user program and another program execution unit for another user program. Also, not just usual data but also a user program can be stored as data in the data block 12.

The control information memory unit 8 stores the control information in correspondence to the data blocks 12 as indicated by dashed lines in FIG. 6. Here, the control information includes access control information such as an identifier of a program execution unit (such as a process identification in UNIX) for which an access such as read or write with respect to the corresponding data block is permitted.

The access check unit 5 receives a request for access to a desired data block from the program execution unit 3, searches out the control information corresponding to that data block in the control information memory unit 8, checks the access control information included in this control information, and judges whether the requested access is permitted or not.

The access unit 6 makes an access to the appropriate data block 12 stored in the data memory unit 11 according to the access request when the requested access is judged as permitted by the access check unit 5, and returns the access result to the program execution unit 3.

Note that the correspondence between the data blocks 12 stored in the data memory unit 11 and the control information stored in the control information memory unit 8 can be made by means of static numbering of the data blocks and the control information, or by means of a pointer to a corresponding data block which is to be written in each control information, or else by means of a pointer to a corresponding control information which is to be written in each data block.

Also, although the access control information is included in the control information in FIG. 6, the access control information may be stored separately from the control information and the control information may be provided with a pointer to a region in which a corresponding access control information is stored such that the access control information can be referred from the control information.

Also, although the control information is stored in the control information memory unit 8 separately from the data memory unit 11 in FIG. 6, the control information may be stored in the data memory unit 11 if desired, and the control information may be stored within a corresponding data block in the data memory unit 11 if desired.

As for a scheme to acquire and allocate regions for storing the data blocks in the data memory unit 11 and the control information in the control information memory unit 8, any of the following schemes can be used, for example.

(1) At a time of activation of the system, the regions for storing the control information and the data blocks are acquired and allocated statically.

(2) According to a request to acquire and allocate a new region from the program execution unit 3, the regions for storing the control information and the data blocks are acquired and allocated dynamically with respect to the control information memory unit 8 and the data memory unit 11, by a unit such as the access check unit 5.

(3) The regions for storing the control information and the data blocks are acquired in advance at a time of activation of the system, and according to a request to allocate a new region from the program execution unit 3, a processing to allocate the acquired regions with respect to the control information memory unit 8 and the data memory unit 11 is carried out by a unit such as the access check unit 5.

Figure 7:
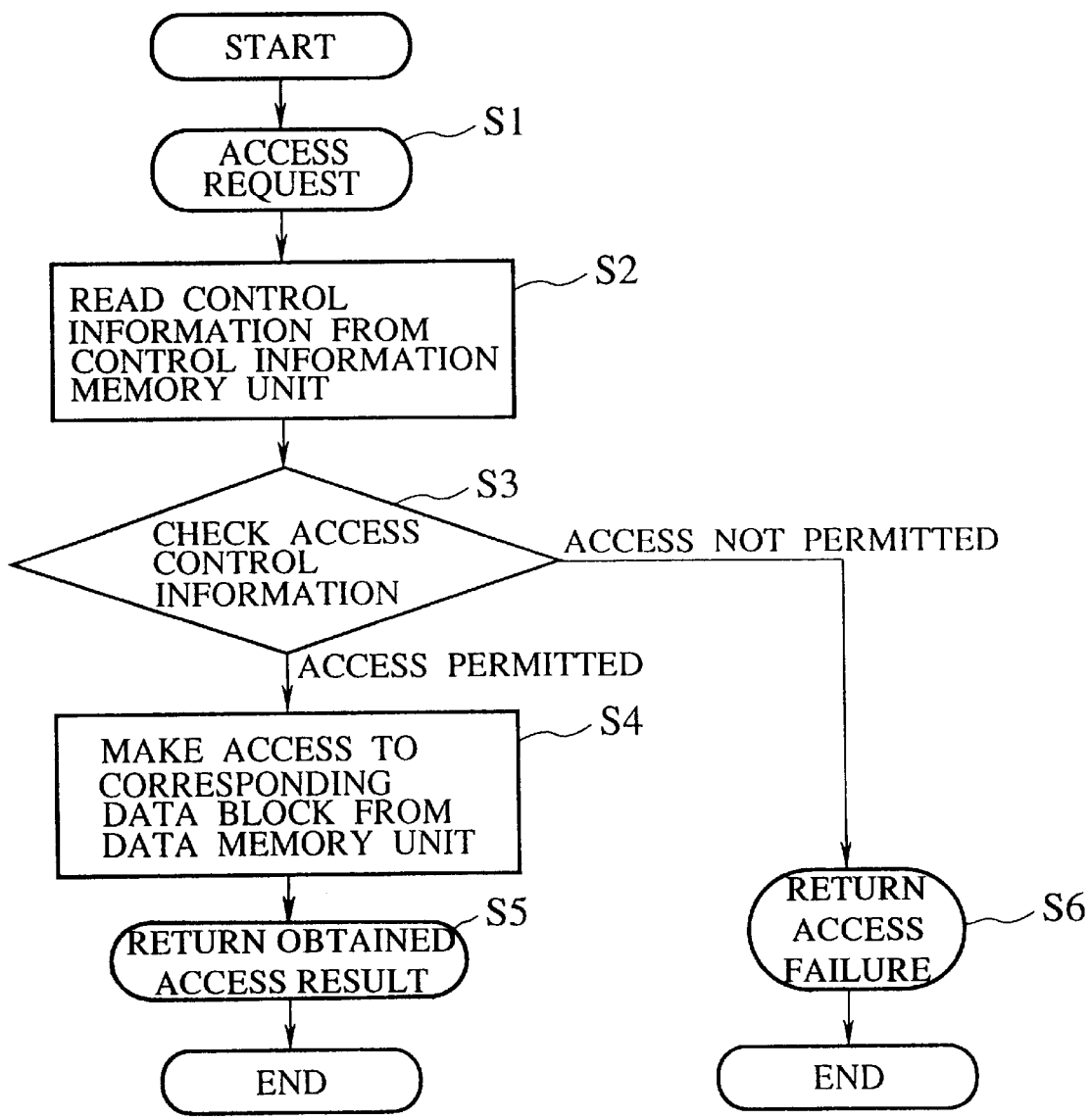
FIG. 7 is a flow chart for a procedure to make an 25 access to a data block in the memory management system of FIG. 6.

In this configuration of FIG. 6, an access from the program execution unit 3 to a data block managed by this memory management system can be made by a procedure according to the flow chart of FIG. 7, as follows.

Here, the program execution unit 3 can be a user process in UNIX, or a device driver for carrying out a processing for a device such as a network interface or a hard disk controller.

For example, in a case where the program execution unit 3 such as a process in UNIX makes an access to a data block to be used for a data exchange with a device such as a network interface or a hard disk controller, the program execution unit 3 transmits an access request for a desired access such as read or write to the access check unit 5 in the control unit 7 (step 51).

Then, the access check unit 5 reads the control 5 information corresponding to the data block requested by the access request in the control information memory unit 8 (step S2), and checks whether the requested access by this program execution unit 3 with respect to that data block is permitted or not according to the access control information contained in the read control information (step S3). Here, in a case where the access control information is stored in the data memory unit 11, the access check unit 5 is going to read a corresponding region in the data memory unit 11. Also, in a case where a pointer to the access control information is stored in the control information, the access check is carried out according to the access control information stored in a region pointed to by that pointer.

When the requested access is a permitted one as a result of the access check, the access unit 6 in the control unit 7 makes the requested access to the corresponding data block (step S4), and returns the obtained access result to the program execution unit 3 which requested that access (step S5). Namely, when the request access is a data read access, the corresponding data block is read and the data read out from this data block are transmitted to the program execution unit 3. Also, when the requested access is a data write access, appropriate data are written into the corresponding data block, and a result of that data write is transmitted to the program execution unit 3.

On the other hand, when the requested access is not a permitted one as a result of the access check, or when the control information corresponding to the requested data block does not exist, a failure of access is returned to the program execution unit 3 which requested that access (step S6).

Now, a mechanism required for realizing the memory management system of FIG. 6 described above will be described in detail.

Figure 8:
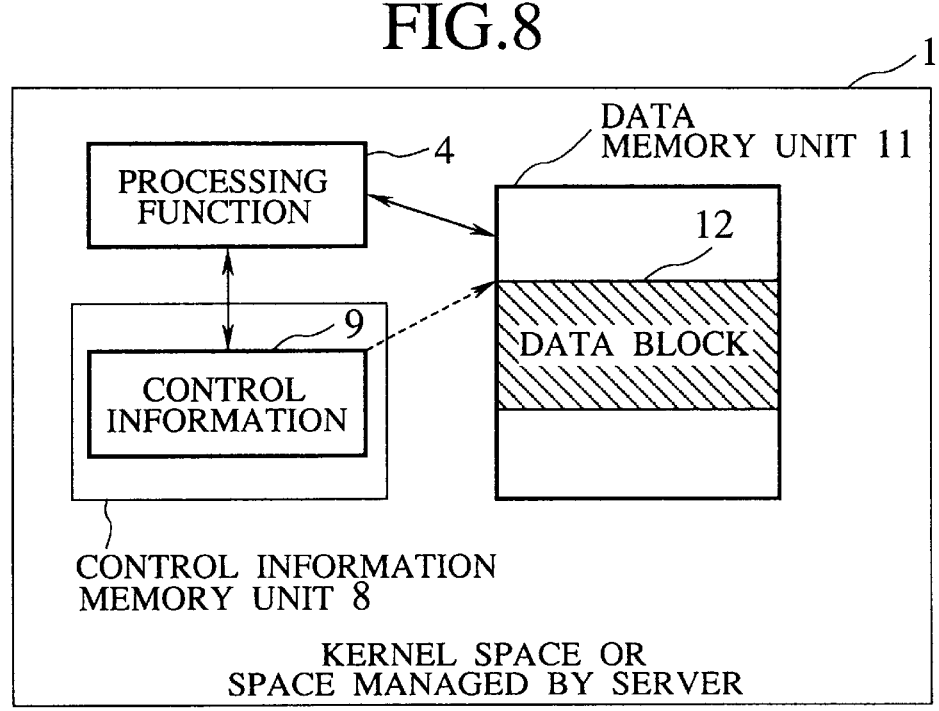
FIG. 8 is a diagram showing one exemplary mechanism for realizing the memory management system of FIG. 6.
Figure 9:
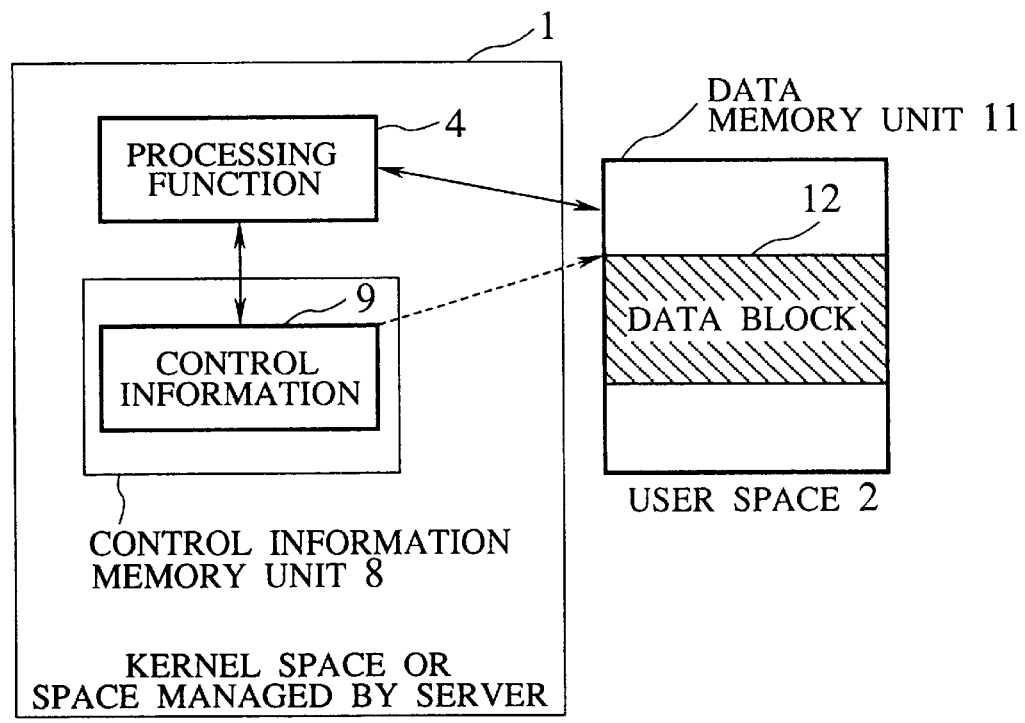
FIG. 9 is a diagram showing another exemplary mechanism for realizing the memory management system of FIG. 6.
Figure 10:
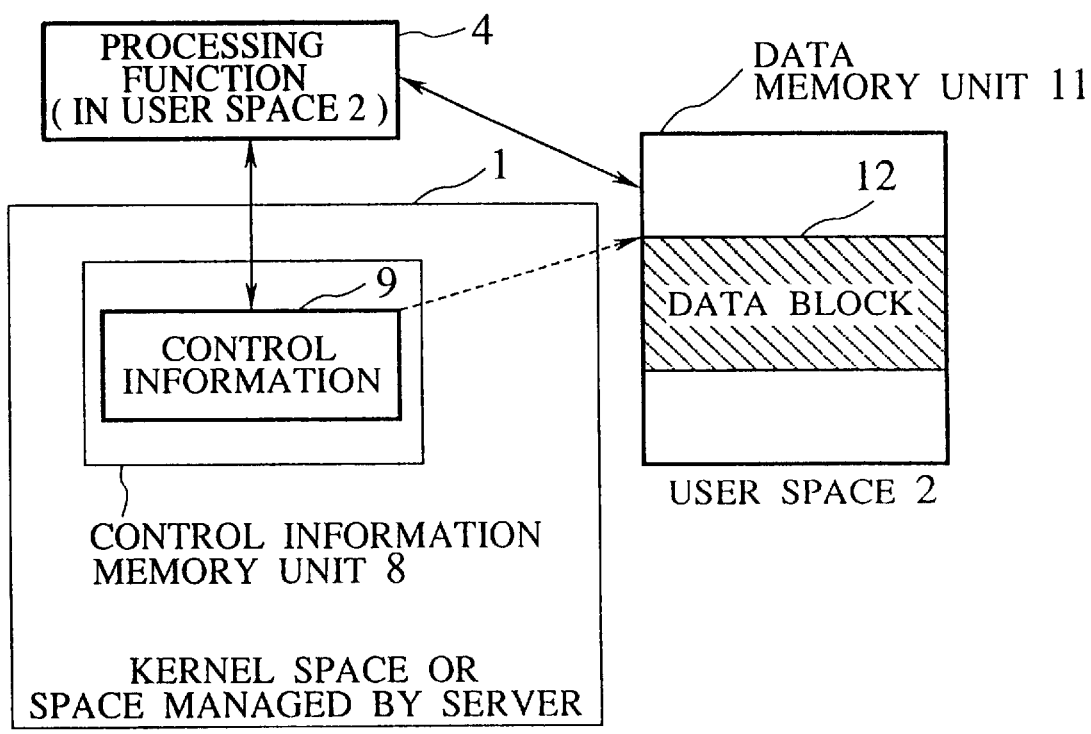
FIG. 10 is a diagram showing still another exemplary mechanism for realizing the memory management system of FIG. 6.

Here, as an example of a mechanism for realizing the access check unit 5 and the access unit 6, a processing function (control function) 4 as shown in FIG. 8 to FIG. 10 will be used. Namely, a user process in UNIX which is the program execution unit 3 is going to make an access to the data memory unit 11 and the control information memory unit 8 by using the processing function (control function) 4.

FIG. 8 to FIG. 10 show three cases which are different from each other in terms of where the data memory unit 11, the control information memory unit 8, and the processing function 4 are provided among a kernel space (or a space managed by a server) 1 and a user space 2.

FIG. 8 shows a "case-A" in which all of the processing function 4, the control information 9, and the data block 12 are provided in the kernel space (or a space managed by a server) 1.

In this "case-A", the control information memory unit 8 and the data memory unit 11 are located inside the kernel space (or a space managed by a server) 1, so that a direct access by a user process in UNIX is prohibited. When there arises a need to make an access to the control information 9 or the data block 12 in order for a process, etc., to exchange data with a device, etc., the control information 9 or the data block 12 is to be accessed via the processing function 4, and the access check is to be carried out at the processing function 4. In this manner, the access protection required in this first embodiment can be realized.

FIG. 9 shows a "case-B" in which the processing function 4 and the control information 9 are provided in the kernel space (or a space managed by a server) 1, while the data block 12 is provided in the user space 2. This "case-B" therefore differs from the above described "case-A" in that the data memory device 11 is located in the user space 2 rather than the kernel space (or a space managed by a server) 1.

In this "case-B", the control information 9 is protected similarly as in the above described "case-A" as the control information memory unit 8 is located inside the kernel space (or a space managed by a server) 1. As for the data block 12, it is possible for a user program to make a direct access to the data block as the data memory unit 11 is located in the same user space as the user process. In this case, the data block 12 can be protected by (1) setting up a rule that a direct access should not be made and an access to the data block 12 should be made via an access to the processing function 4, or (2) protecting the data block 12 page by page, or else (3) protecting data less than a page or data more than a page by a protection function provided by a segment, in a case of a processor capable of handling segments. In this manner, the access protection required in this first embodiment can be realized.

FIG. 10 shows a "case-C" in which only the control information 9 is provided in the kernel space (or a space managed by a server) 1, while the processing function 4 and the data block 12 are provided in the user space. This "case-C" therefore differs from the above described "case-B" in that the processing function 4 is located in the user space 2 rather than the kernel space (or a space managed by a server) 1.

In this "case-C", the access protection required in this first embodiment can be realized by setting up a rule that the algorithm similar to that for the processing function 4 of the above described "case-A" or "case-B" is to be observed. In this "case-C", there is an advantage in that the processing function 4 can be a part of a user process.

Next, with references to FIG. 11 to FIG. 14, the data transfer from one device to another device in this first embodiment will be described in detail, for a case in which the X server process displays image data transferred via a network on a display device (receiving side), and for a case in which image data stored in a device such as a hard disk are read out and transferred from a network interface to a network (transmitting side).

Figure 11:
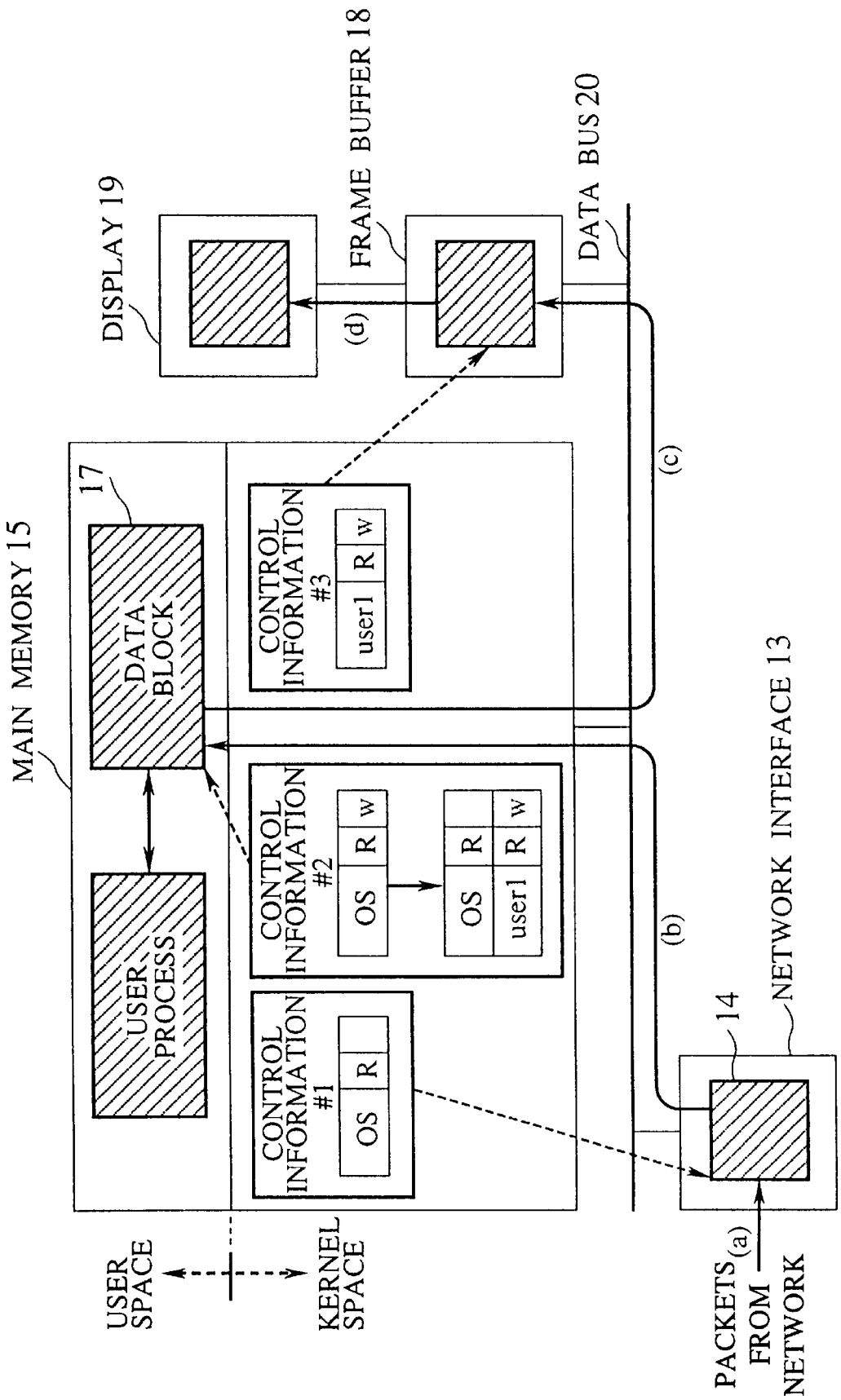
FIG. 11 is a diagram showing how one exemplary data transfer is carried out on a receiving side according to the first embodiment of the present invention.

FIG. 11 shows an exemplary case of data transfer (receiving side) in the above described "case-C" of FIG. 10.

In FIG. 11, the packets transferred via a network are temporarily stored in a buffer 14 on a network interface 13 first (path or "step" (a) of FIG. 11).

Then, a driver in the OS checks whether it is permitted to transfer the received data from the buffer 14 to a data block 17 located in the user space of a main memory 15 or not. This check is done by confirming that the access control information for which "Read" by the OS is permitted is included in the access control information contained in "control information #1", and at the same time the access control information for which "Write" by the OS is permitted is included in the access control information contained in "control information #2". When the data transfer is permitted as a result of this check, the received data are transferred to the data block 17 by the driver in the OS via a data bus 20 (step (b) of FIG. 11).

Next, during the processing at the data block 17, in order to prevent the data block 17 from being overwritten, the access control information contained in the "control information #2" is changed such that "Write" by the OS is not permitted, and the processing such as a protocol processing is carried out by a module for processing a network protocol in the OS. After this processing, the access control information contained in the "control information #2" is changed to make the data block 17 accessible by the user process such as the X server process.

After the user process such as the X server process carried out the necessary processing such as the image conversion with respect to the data block 17, whether it is permitted to transfer the converted image data to a frame buffer 18 or not is checked. This check is done by confirming that the access control information for which "Read" by "user 1" is permitted is included in the access control information contained in "control information #2", and at the same time the access control information for which "Write" by "user 1" is permitted is included in the access control information contained in "control information #3".

When the data transfer is permitted as a result of this check, the converted image data are transferred from the data block 17 to the frame buffer 18 via the data bus 20 either by the user process or by the driver in the OS (step (c) of FIG. 11), and then transferred from the frame buffer 18 to a display device 19 so that the image data are displayed on the display device 19 (step (d) of FIG. 11).

Note that the frame buffer 18 and the display device 19 shown in FIG. 11 may be replaced by a hard disk controller and a hard disk, respectively.

Figure 1:
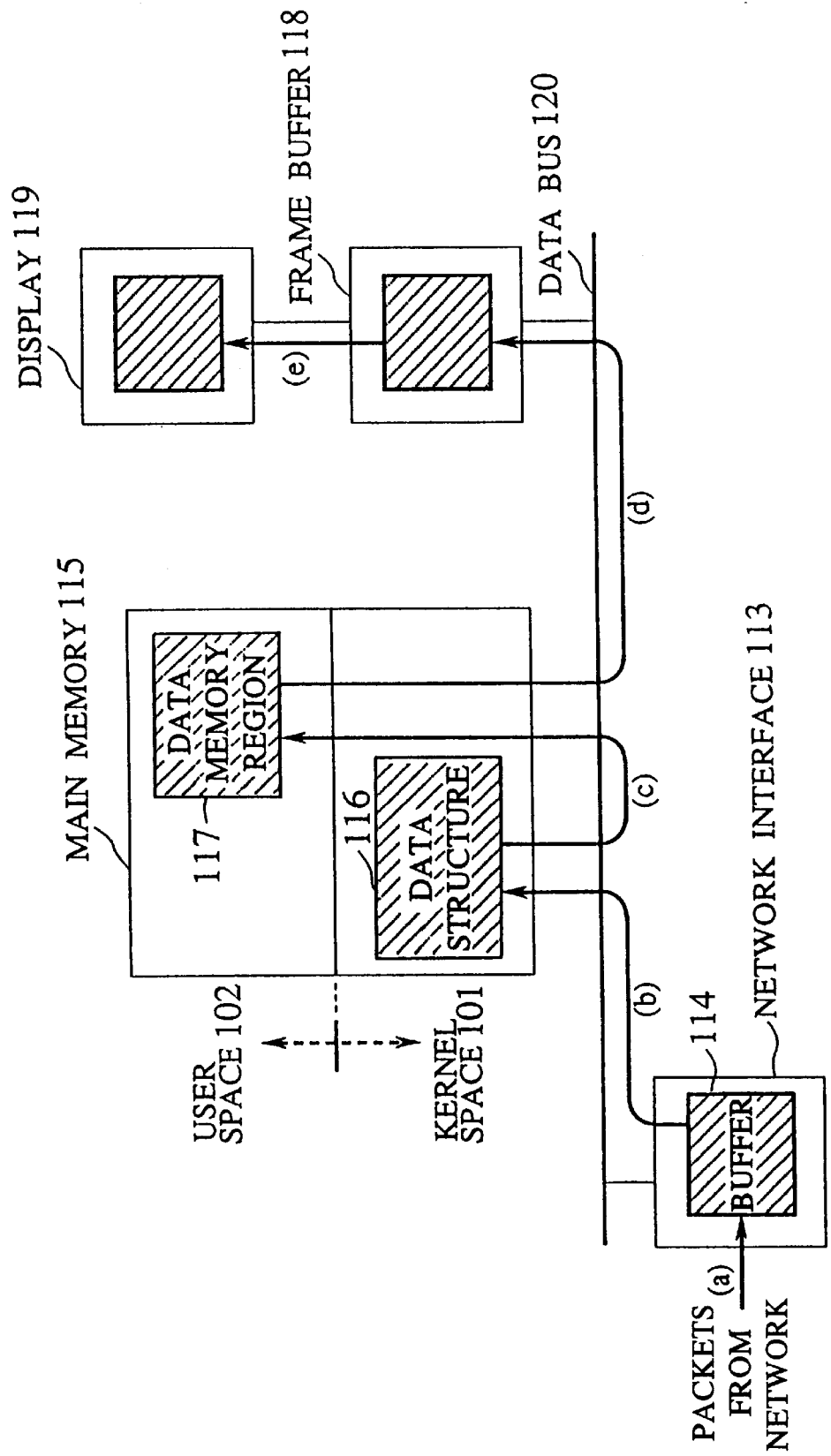
FIG. 1 is a diagram illustrating how a conventional method of data transfer from one device to another device works.

By comparing this data transfer shown in FIG. 11 with a conventional data transfer shown in FIG. 1 described above, it can be seen that the data transfer method of this first embodiment can reduce a number of times for transferring data by one from that required in the conventional data transfer method.

Note that, although a module for processing a network protocol in the OS carries out the data processing such as the protocol processing with respect to data transferred to the data block 17 in the above description, this module may carry out the processing with respect to the received data stored in the buffer 14 on the network interface 13 and transfer the received data after the processing to the data block 17.

Note also that, although the user process such as the X server process carried out the image conversion with respect to the same data in the data block 17 that are transferred by a driver in OS in the above description, a user process such as X server process may store the converted data into another data block different from the data block to which the data are transferred by a driver in the OS, and transfer the converted data from that another data buffer to the frame buffer 18.

Note also that, an exemplary case of "case-C" of FIG. 10 has been described in the above, but in a case of "case-A" of FIG. 8, the data block is located in the kernel space. Also, when there are two data blocks, both of these two data blocks may be located in the user space, or one data block may be located in the user space while the other data block is located in the kernel space, or else both of these two data blocks may be located in the kernel space.

Figure 12:
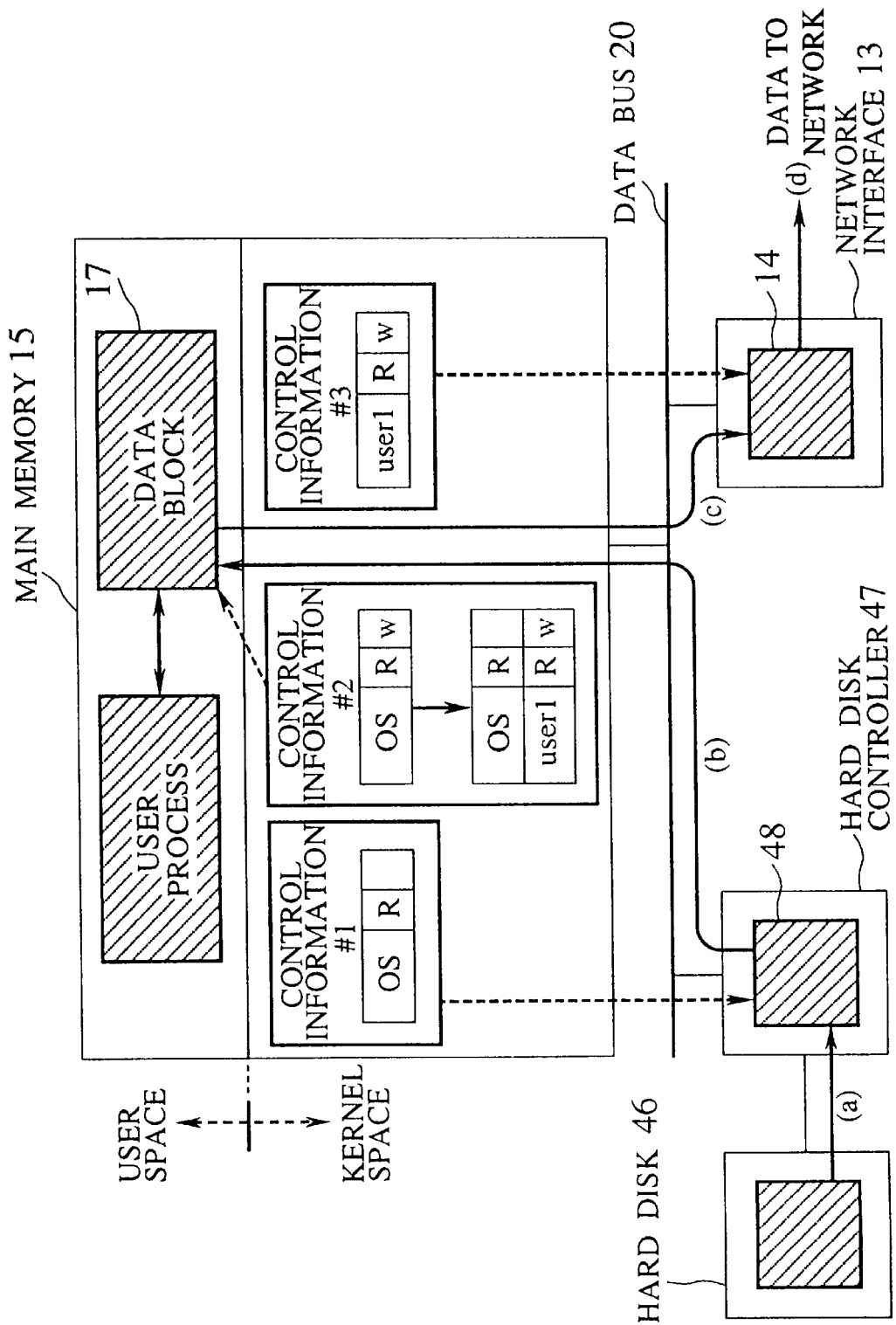
FIG. 12 is a diagram showing how one exemplary data transfer is carried out on a transmitting side according to the first embodiment of the present invention.

FIG. 12 shows an exemplary data transfer on the transmitting side in which image data existing in a hard disk device 46 are to be transferred to a network via a network interface 13.

Similarly as in the example of the receiving side described above, the actual data transfer takes place after the access control information is checked, both at a time of transferring data existing in a buffer 48 on a hard disk controller 47 to the data block 17 in the user space of the main memory 15 and at a time of transferring data existing in the data block 17 to the buffer 14 on the network interface 13.

Here, the access control information contained in the "control information #2" is changed similarly as in a case of FIG. 11 described above.

Figure 13:
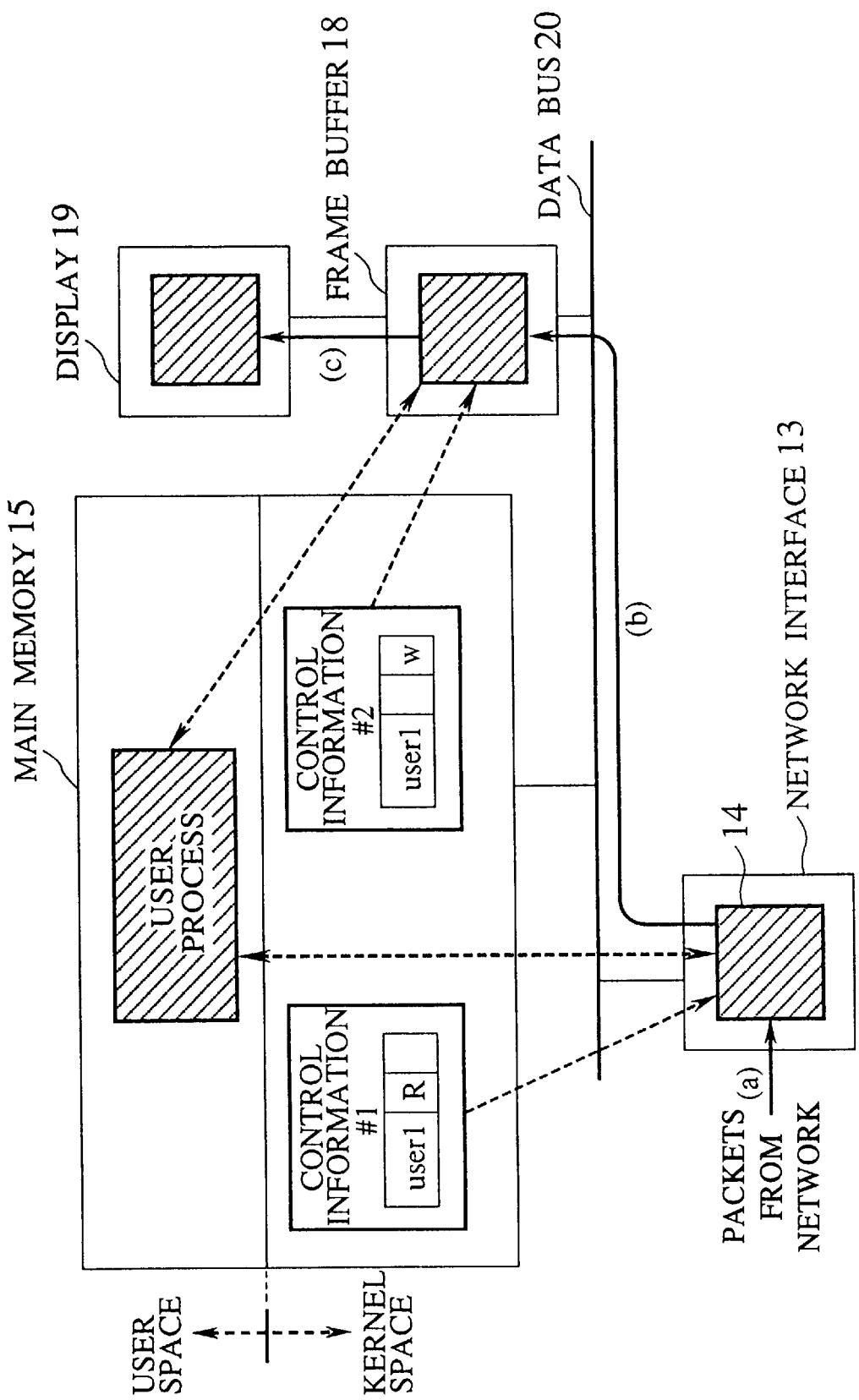
FIG. 13 is a diagram showing how another exemplary data transfer is carried out on a receiving side according to the first embodiment of the present invention.

FIG. 13 shows an exemplary data transfer on the receiving side which requires data transfer for even less number of times than a case of FIG. 11 described above.

In FIG. 13, the packets transferred via a network are stored in the buffer 14 on the network interface 13 (step (a) in FIG. 13). Then, after the protocol processing is carried out by a network protocol processing module in the OS, the access control information contained in the "Control-information #1" is changed such that the buffer 14 becomes accessible by the X server process (user process).

The X server process then carries out the necessary processing such as the image conversion with respect to the received data stored in the buffer 14, and carries out the check of the access control information contained in the "control information #2" in order to transfer the converted image data to the frame buffer 18.

When the data transfer is permitted as a result of this check, the converted image data are transferred from the buffer 14 to the frame buffer 18 via the data bus 20 either by the X server process (user process) or by the driver in the OS (step (b) of FIG. 13), and then transferred from the frame buffer 18 to a display device 19 so that the image data are displayed on the display device 19 (step (c) of FIG. 13).

Note that the frame buffer 18 and the display device 19 shown in FIG. 13 may be replaced by a hard disk controller and a hard disk, respectively.

Note also that, although the user process such as the X server process makes a direct access to the buffer 14 on the device such as the network interface 13, and the data after the image conversion are transferred to the buffer such as the frame buffer 18 in the above description, it is also possible to transfer the data after the image conversion to the data block existing in the main memory 15 once, and transfer the data from that data block to a buffer such as the frame buffer 18.

Figure 14:
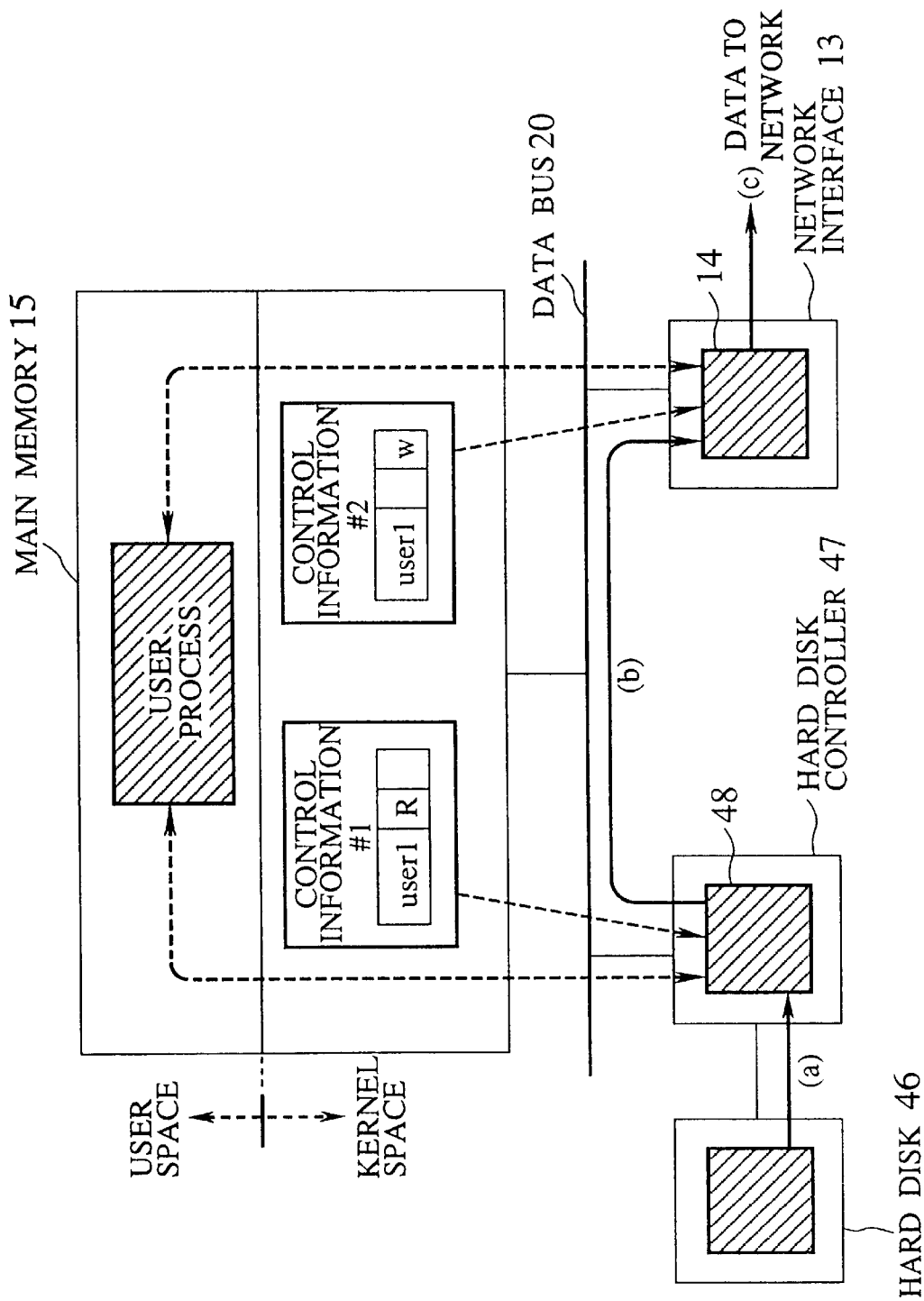
FIG. 14 is a diagram showing how another exemplary data transfer is carried out on a transmitting side according to the first embodiment of the present invention.

FIG. 14 shows an exemplary data transfer on the transmitting side in which the similar data transfer method as in FIG. 13 described above is adopted, so that it requires data transfer for even less number of times than a case of FIG. 12 described above.

Similarly as in the example of the receiving side described above, the actual data transfer takes place after the access control information is checked, at a time of transferring data existing in the buffer 48 on the hard disk controller 47 to the buffer 14 on the network interface 13.

As described, in the conventional OS such as UNIX, it has been necessary to transfer data from a data block to be used for data exchange with a device to a data region managed by a program execution means whenever data are to be transferred from a device such as a network interface or a hard disk controller to a program execution means. In contrast, according to this first embodiment, the program execution means can make a direct access to the data block, so that the data exchange between the device and the program execution means can be realized efficiently, without requiring extra data transfer.

In addition, according to this first embodiment, when a device such as a network interface or a hard disk controller makes an access to a data block, it is easily possible to make only a program execution means for controlling this device accessible to that data block and a program execution means such as a user process in UNIX inaccessible to that data block, by changing the access control information, so that it is possible to realize the efficient mutually exclusive control of the program execution unit which make accesses to the data block.

Moreover, in the conventional OS such as UNIX, it has been necessary to actually transfer data from a transfer source device to the program execution unit once and then from the program execution unit to a transfer destination device whenever data are to be transferred from a device such as a network interface or a hard disk controller to another device such as a display device via the program execution unit such as a user process in UNIX. In contrast, according to this first embodiment, it is possible for the program execution unit to make a direct access to a data block allocated for the data exchange between a transfer source device and the program execution unit, so that there is no need to actually transfer data from the transfer source device to the program execution unit.

Similarly, it is possible for the transfer destination device to make a direct access to the data block, so that there is no need to actually transfer data from the program execution unit to the transfer destination device.

Consequently, it is possible to realize the efficient data exchanges among a plurality of devices and a plurality of program execution unit in this first embodiment.

Furthermore, according to this first embodiment, it is possible to adopt a scheme in which regions for the control information and the data blocks are acquired in advance and allocated to the program execution unit according to a request from the program execution unit, so that it is possible to process the request to acquire and allocate regions from the program execution unit more efficiently compared with a scheme for acquiring and allocating regions at a time of a request.

Figure 2:
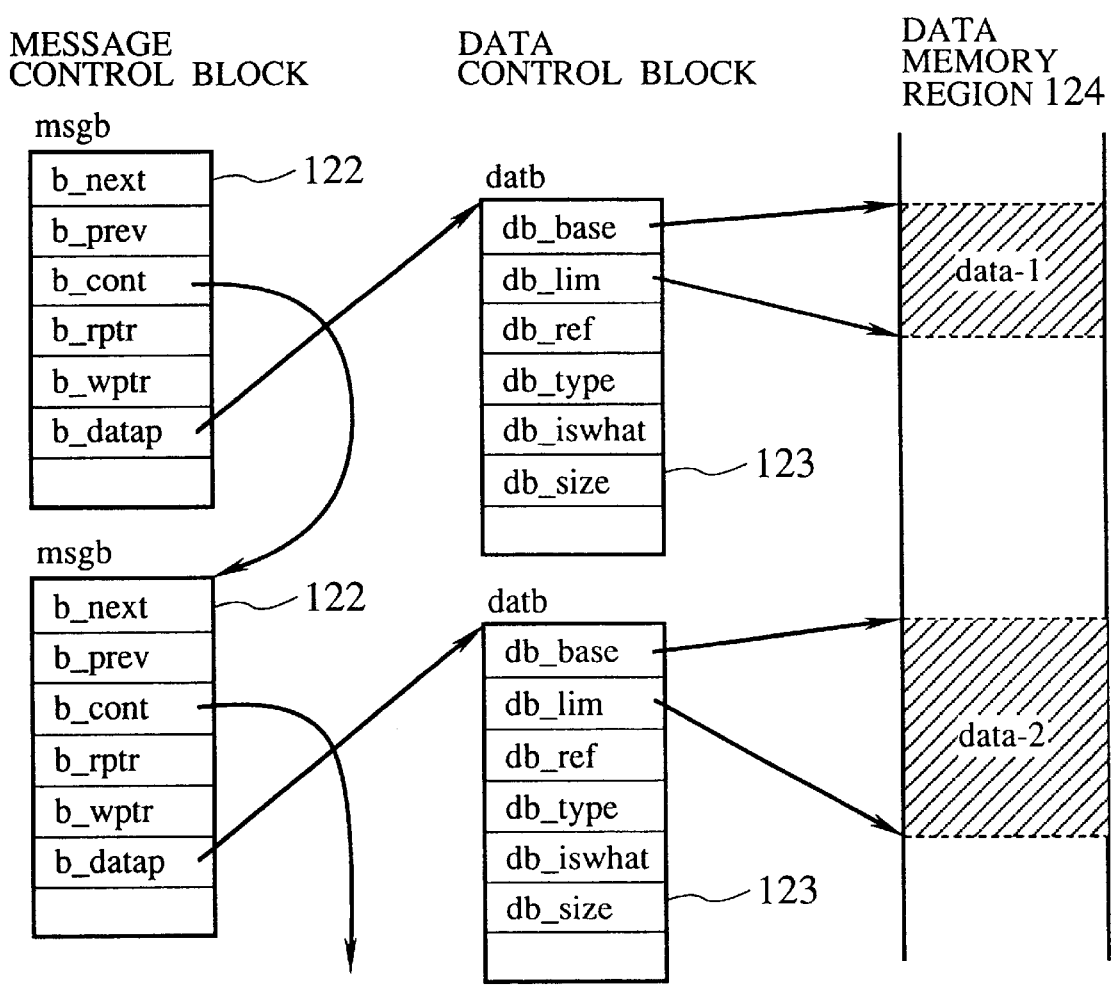
FIG. 2 is a diagram illustrating how a conventional management mechanism called stream works.
Figure 3:
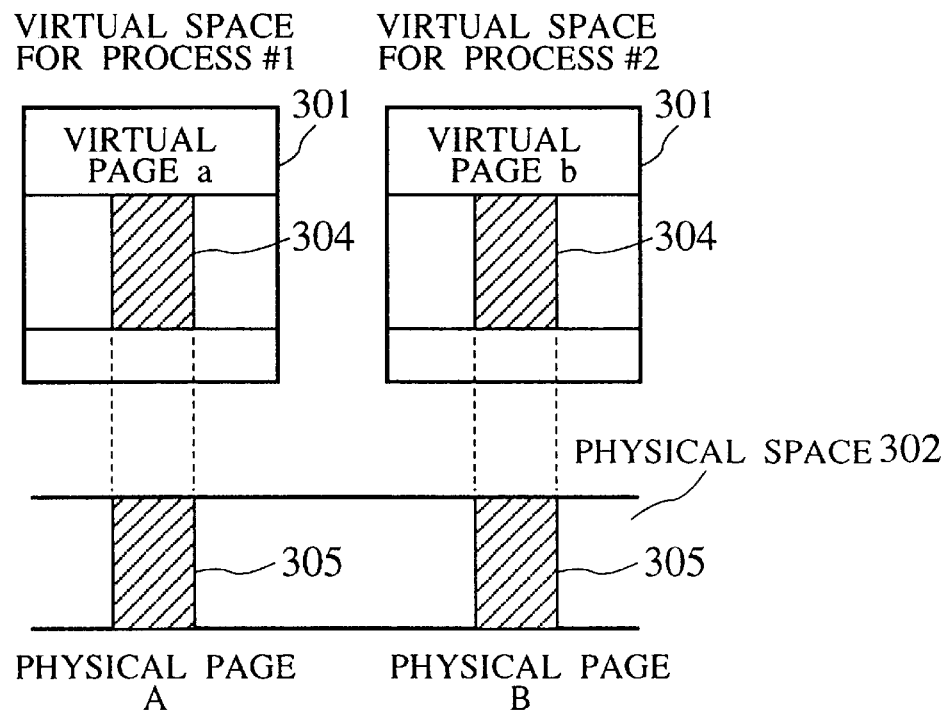
FIG. 3 is a diagram illustrating an exemplary conventional mapping between virtual pages and physical pages.
Figure 4:
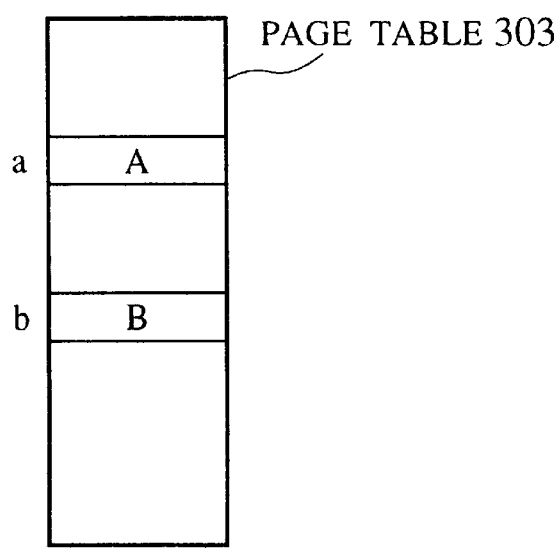
FIG. 4 is a diagram illustrating an exemplary state of a conventional page table corresponding to the conventional mapping of FIG. 3.
Figure 5:
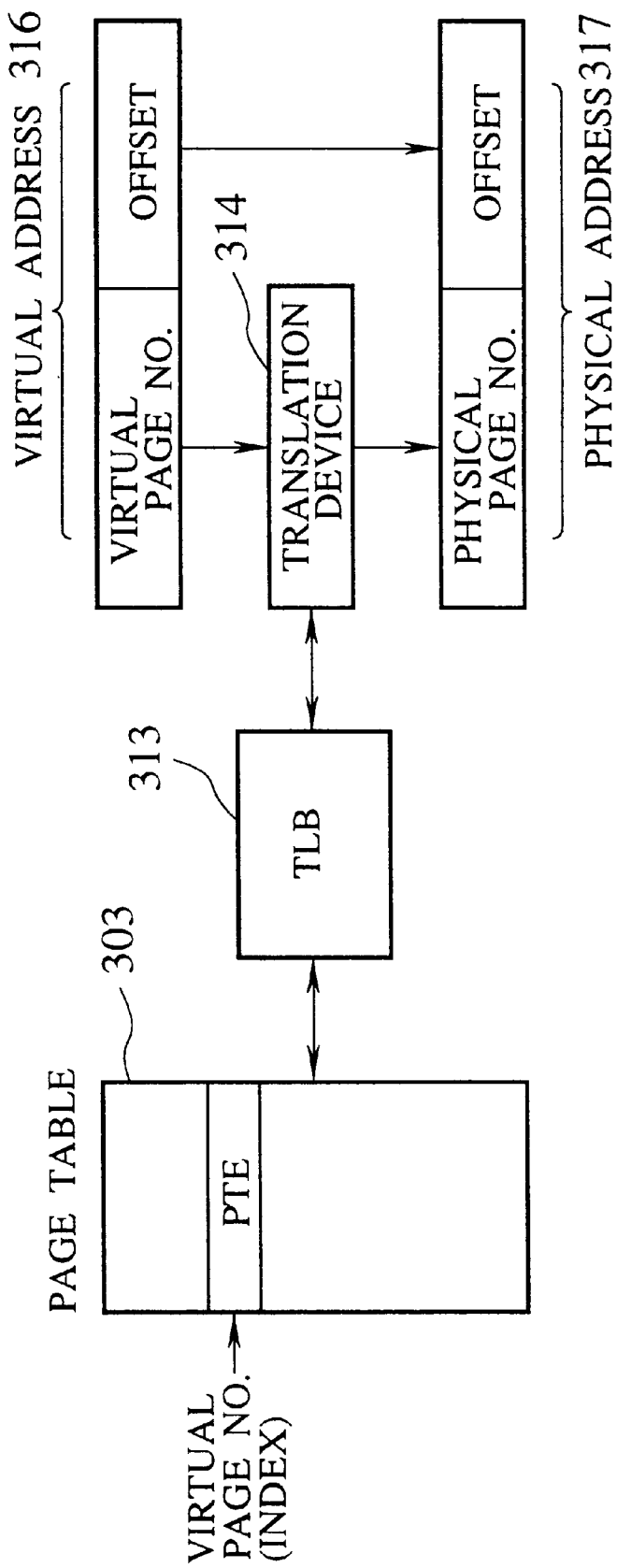
FIG. 5 is a diagram showing how converting a virtual address is converted into a physical address in a conventional computer conventionally.

Next, with references to FIG. 15 and FIG. 16, an example of a data block management method according to this first embodiment will be described in detail. The following example is directed to a modification of the management mechanism called STREAMS described above in conjunction with FIG. 2 according to this first embodiment.

Figure 15:
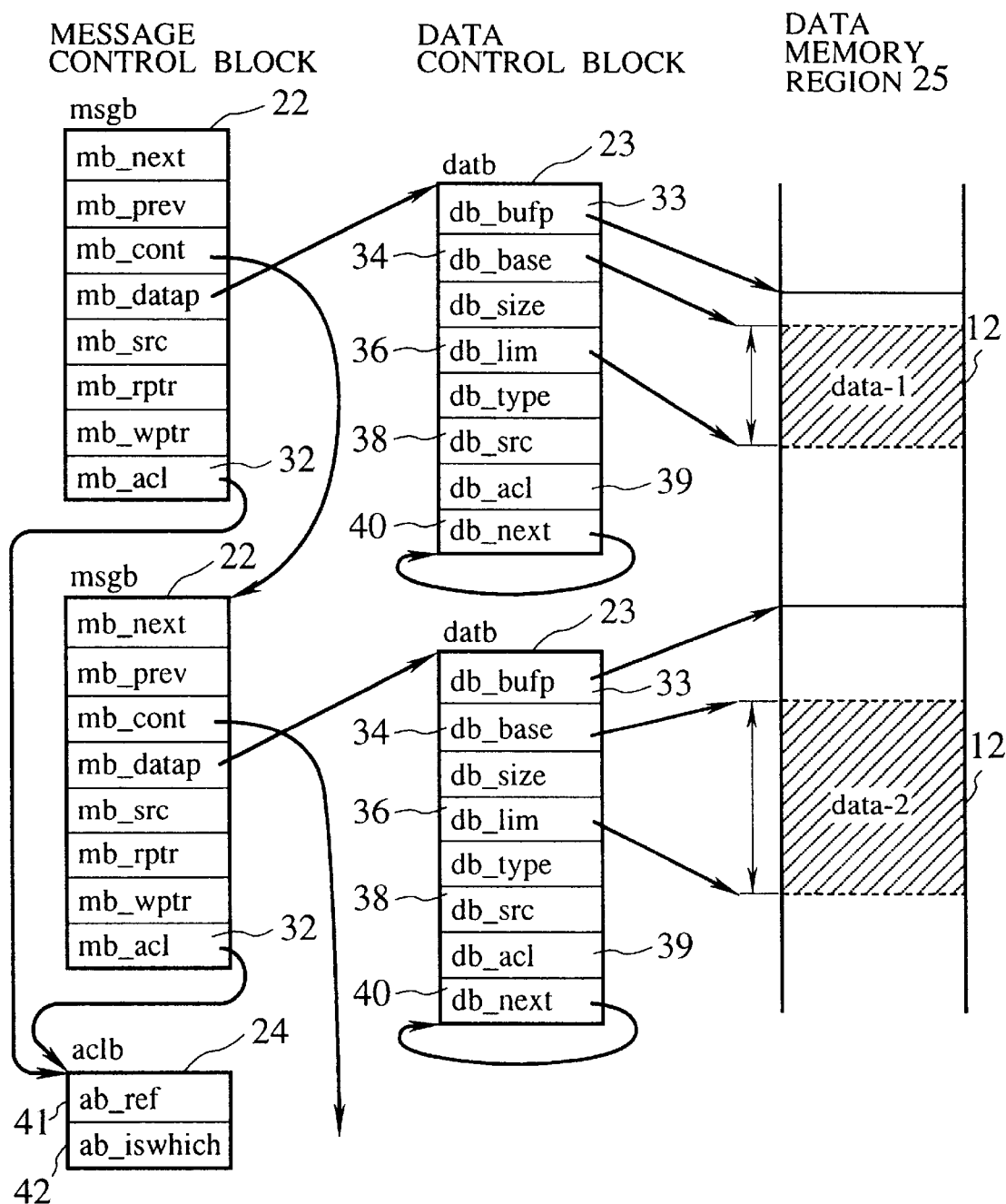
FIG. 15 is a diagram illustrating a control information used in a modified stream management mechanism according to the first embodiment of the present invention.

FIG. 15 shows the control information comprising message control blocks (msgb) 22, data control blocks (datb) 23, and an access control information (aclb) 24, and data blocks 12 in a data memory region 25 corresponding to the above control information.

Note that each of "control information #1", "control information #2", and "control information #3" described above may contain all these message control blocks (msgb), data control blocks (datb), and access control information (acib) as shown in FIG. 15. Also, each of "control information #2" and "control information #3" may just contain the access control information (aclb) without any message control block (msgb) and data control block (datb).

In FIG. 15, "mb_acl" 32 included as a member of the message control block (msgb) 22 is a pointer to a region which stores the access control information (aclb) 24 for that message control block (msgb) 22.

FIG. 15 shows an exemplary case in which the access control information (aclb) 24 comprises "ab_ref" 41 for storing a number of program execution unit (a number of processes in UNIX, for example) which are referring to the message control block (msgb) 22, and "ab_iswhich" 42 for storing an identifier of the program execution unit (a process ID in UNIX, for example) which owns the message control block (msgb) 22.

In this access control information (aclb) 24 shown in FIG. 15, data stored in constituent members of the message control block (msgb) 22 can be changed only by a process which has a process ID stored in the "ab_iswhich" 42. Also, an allocation of a region for the message control block (msgb) 22 can be released to delete that message control block (msgb) 22 only when a value stored in the "ab_ref" 41 is 0.

Note that, although the pointer (mb_acl) to a region which stores the access control information (aclb) for the message control block (msgb) 22 is stored in that message control block (msgb) 22 in FIG. 15, it is also possible to write the access control information (aclb) directly into the message control block (msgb) 22 instead of using the pointer, and it is also possible to use an access control list which links a plurality of access control information (aclb). The same remark also applies to a pointer "db_acl" 39 included as a constituent member of the data control block (datb) 23.

Also, "db_bufp" 33 included as a constituent member of the data control block (datb) 23 is a pointer to a data block to be used for data exchanges between devices. In the conventional STREAMS, only a top and a bottom of a region which actually stores data are indicated by "db_base" and "db lim ", but in this first embodiment, a region that can store data is reserved and a pointer for pointing to this region is stored in "db_bufp" 33, while a top and a bottom of a region which actually stores data are indicated by "db_base" 34 and "db_lim" 36. In this manner, it becomes possible to attach data at a region ahead or behind of the region which actually stores data as indicated by "db_base" 34 and "db_lim" 36, so that at a time of producing data such as a packet, it becomes possible to efficiently attach a data region such as a header in front of the data itself.

In addition, it is possible to manage regions efficiently by means of a management to allocate a region which actually stores data or release an allocation for each reserved region that can store data.

Also, "db_next" 40 included as a constituent member of the data control block (datb) 23 is used in linking more than one data control block in a case where a reserved region that can store data is to be divided and managed by more than one data control block. By linking data control blocks which correspond to the same region, it is possible to manage a number of data control blocks which are referring to that region, and it is possible to release the allocation of that region when there is no data control block which refers to that region, so that it becomes possible to realize the releasing of the allocation of the divided regions efficiently.

Now, with reference to FIG. 15 and FIG. 16, exemplary cases for allocation of the data control block (datb) 23 and releasing of the allocation in this first embodiment will be described in detail.

Figure 16:
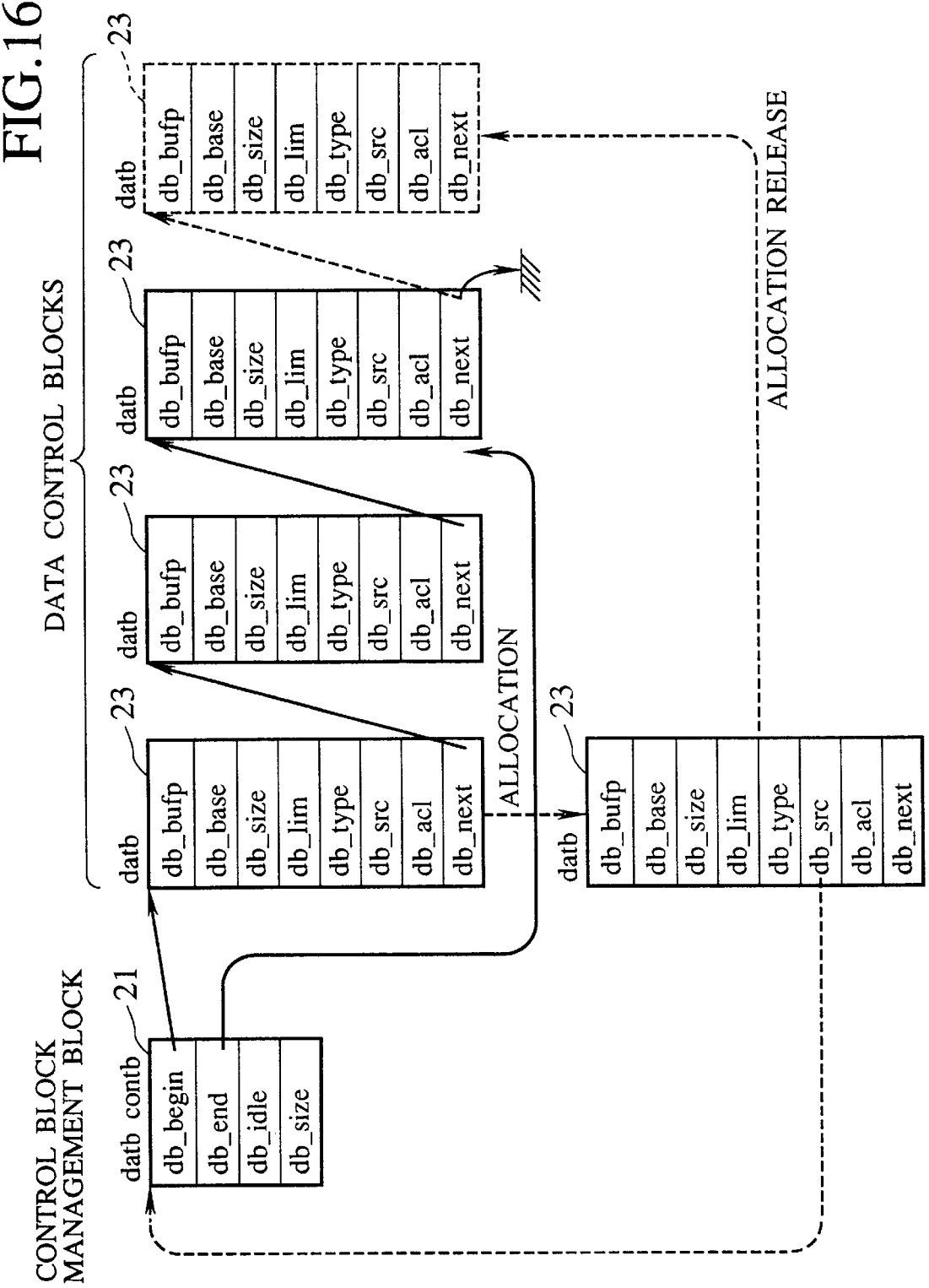
FIG. 16 is a diagram illustrating a data block management method in a modified stream management mechanism according to the first embodiment of the present invention.

In FIG. 15, "db_src" 38 included as a constituents member of the data control block (datb) 23 is a pointer to a structure called a control block management block (datb contb) 21 shown in FIG. 16 which manages the data control blocks. In the following, the function of this "db_src" 38 will be described.

As shown in FIG. 16, in this first embodiment, data regions for the message control blocks (msgb) 22 and the data control blocks (datb) 23 are acquired in advance, and control blocks which are not allocated to processes (which will be referred hereafter as vacant control blocks) are managed as a linked list. The control block management block (datb contb) 21 shown in FIG. 16 is a management structure for managing vacant control blocks, in which a top vacant control block in the linked list is indicated by "db_begin" 43 and a last vacant control block in the linked list is indicated by "db_end" 44.

When a process requests an allocation of a data control block (datb) 23, the top vacant control block indicated by "db_begin" 43 is taken out from the linked list and allocated to the process. Also, when the process returns the data control block (datb) 23 as the process finished using it, the returned data control block is added behind the last vacant control block indicated by "db_end" 44, and "db_end" 44 is updated. In this manner, the vacant control blocks are managed by means of the linked list.

By acquiring regions for data control blocks (datb) 23 in advance, managing the acquired data control blocks (datb) 23 by means of the linked list, and allocating the data control block (datb) 23 from the linked list at a time of a request for the data control block (datb) 23) from the process as described above, it is possible to allocate the data control block very quickly as there is no need to acquire a region at a time of the request.

Also, by writing the pointer "db_src" 38 to a 15 structure of the control block management block (datb contb) 21 in the data control block (datb) 23 as described above, it is possible to know the address of the structure of the control block management block (datb contb) 21 easily in a case of releasing the allocation of the data control block (datb) 23 after the process finished using that data control block (datb) 23, so that it is possible to realize the releasing of the allocation efficiently.

Note that, in the above description, a case of actually transferring data has been described as the data transfer, but this first embodiment is also equally applicable to the data transfer realized by rewriting pointers for making correspondences between physical pages and logical pages without actually transferring data.

Namely, "db bufp" 33 shown in FIG. 15 is to be written in a pointer existing in the TLB (Translation Lookaside Buffer) and pointing from a logical page existing in a virtual space to be accessed by a user to a physical page existing on an actual physical memory, and by writing a value of this "db_bufp" 33 into a pointer for a particular logical page, it becomes possible to transfer data to that particular logical page.

Note also that "mb_src" 29 included as a member of the message control block (msgb) 22 functions similarly as "db src" 38 described above.

Next, with references to FIG. 17 to FIG. 31, the second embodiment of a data transfer method and a memory management system according to the present invention will be described in detail.

This second embodiment is directed to a scheme in which a data transfer between processes is realized by changing a mapping between virtual pages and physical pages, instead of actually transferring data, using access control information assigned to physical pages.

Figure 17:
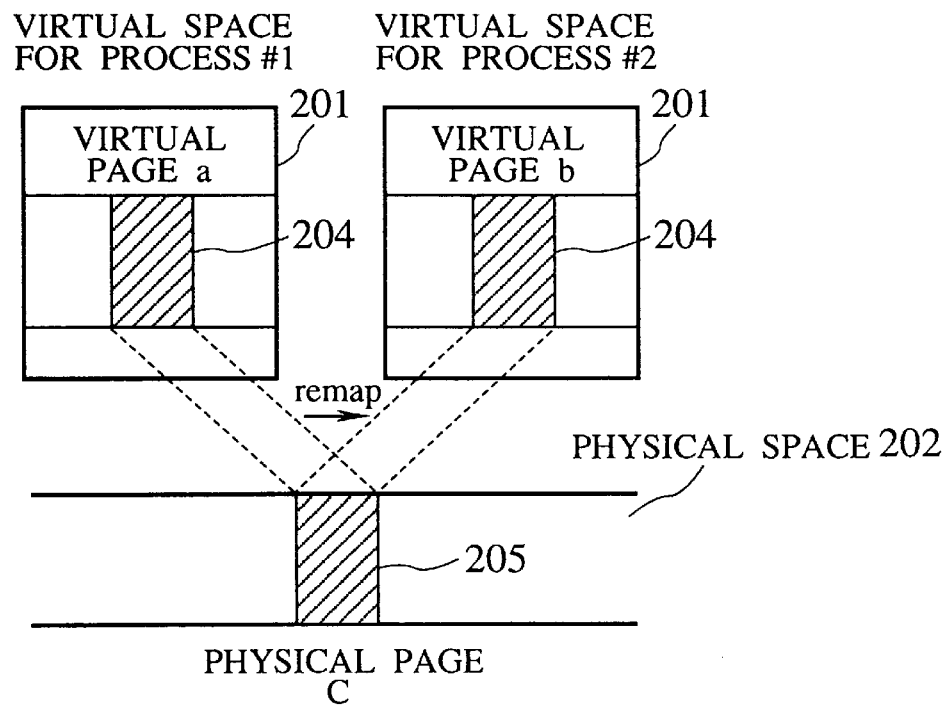
FIG. 17 is a diagram illustrating an exemplary mapping between virtual pages and physical pages according to the second embodiment of the present invention.
Figure 18:
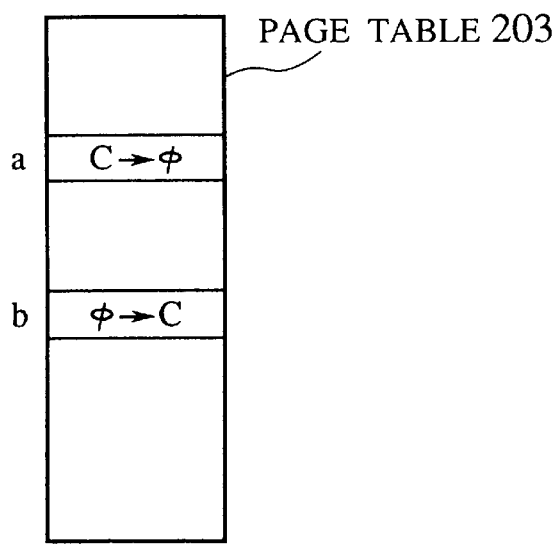
FIG. 18 is a diagram illustrating an exemplary state of a page table corresponding to the mapping of FIG. 17.

FIG. 17 and FIG. 18 illustrate a basic principle of a data transfer method according to this second embodiment.

At a time of execution, a program can be regarded as execution subjects called processes, so that the OS can manage the execution of the program in units of these processes. In the following, this management unit at a time of execution of a program will be referred to as a process. This process usually owns one or more virtual spaces 201.

Now, a physical space 202 such as a memory is managed in units of physical pages 205, where each physical page has a prescribed size such as 4 k bytes, for example.

On the other hand, the virtual space 201 is managed in units of virtual pages 204, where each virtual page has the same size as a physical page such as 4 k bytes, for example.

A correspondence between the virtual pages and the physical pages is made by a page table 203 shown in FIG. 18, where this page table 203 can be referred to by using a virtual page number as an index so as to search out a page table entry (PTE). Each page table entry registers a physical page number and an access control information indicating whether this physical page is writable, executable, etc.

As indicated in FIG. 18, in a case of carrying out a data transfer between processes in this second embodiment, a physical page number of a physical page C registered in a page table entry corresponding to a virtual page "a" which belongs to a virtual space owned by a transfer source process is deleted (by changing C to 0) so that it becomes impossible for the transfer source process to make an access to the physical page C, while a physical page number of the physical page C is registered (by changing C to 0) into a page table entry corresponding to a virtual page "b" which is allocated for storing transfer data in a virtual space owned by a transfer destination process so that it becomes possible for the transfer destination process to make an access to the physical page C.

In this manner, a data transfer from the transfer source process to the transfer destination process can be realized by changing a mapping between virtual pages and physical pages, without actually transferring data.

Figure 19:
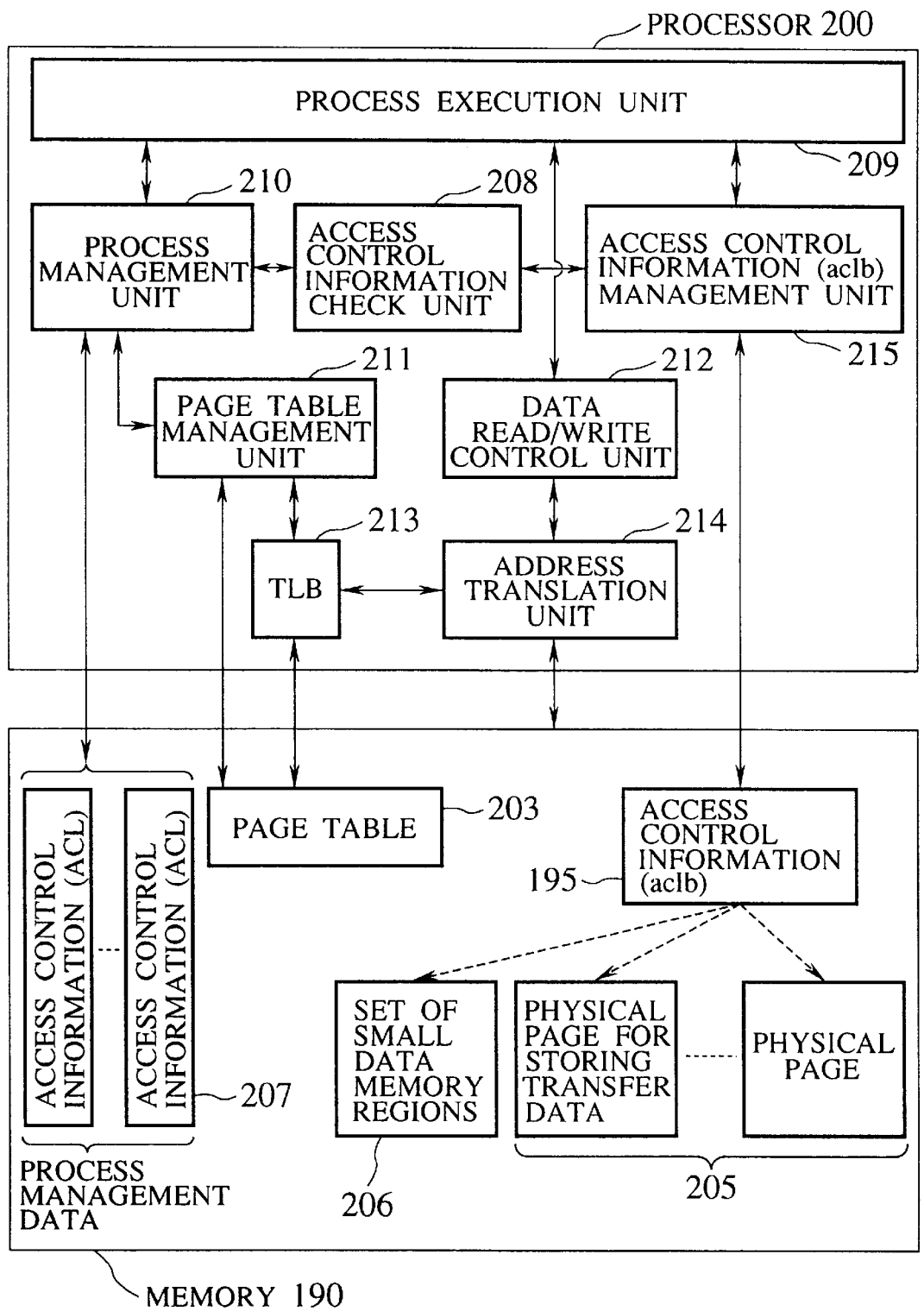
FIG. 19 is a block diagram of an exemplary internal configuration of a computer implementing the second embodiment of the present invention.

FIG. 19 shows an exemplary internal configuration of a computer implementing this second embodiment, which includes a processor 200 and a memory 190.

In the configuration shown in FIG. 19, the processor 200 includes an access control information check unit 208, a process execution unit 209, a process management unit 210 connected with the access control information check unit 208 and the process execution unit 209, a page table management unit 211 connected with the process management unit 210, a data read/write control unit 212 connected with the process execution unit 209, a translation lookaside buffer (TLB) 213 connected with the page table management unit 211, an address translation unit 214 connected with the data read/write control unit 212 and the TLB 213, and an access control information (aclb) management unit 215 connected with the access control information check unit 208 and the process execution unit 209.

Also, the memory 190 contains access control information (aclb) 195, a page table 203, a physical pages 205, a process management data 207 including access control information (ACL). In addition, a set of small data memory regions 206 is allocated within the memory 190 according to need.

The functions of the processor 200 and memory 190 can be implemented as functions of the OS, for example.

The process execution unit 209 is a unit for executing a program in units of processes.

The process management unit 210 is a unit for managing the process management data 207 stored in the memory 190. This process management unit 210 can provide the access control information (ACL) included in the process management data 207 to the access control information check unit 208. Here, the process management data 207 are management data corresponding to processes.

The access control information (ACL) is an information on data transfer that can be accepted by a process or a virtual space. A concrete example of the access control information (ACL) includes "a process ID (accompanied by the reading right) of a transfer source process which possesses accessible data", or "a process group ID number (accompanied by the reading right)" (or a process identifier attached to a group of processes when a plurality of transfer source processes are present), for example.

The access control information management unit 215 is a unit for managing an access control information (aclb) corresponding to a data transfer.

The access control information (aclb) 195 is a data structure corresponding to data stored in a physical page (that is, transfer data). A concrete example of the access control information (aclb) includes "a process ID (accompanied by the writing right) which acquired that physical page first", or "an ID (and a write right) of a process group to which that group belongs to", for example.

In this second embodiment, the access control information (aclb) is attached to each physical page, where this access control information (aclb) indicates a process ID (of an owner) which obtained this physical page as an empty physical page and wrote data therein. This access control information (aclb) may also include supplementary information as to what type of access (read only, read/write, both, etc.) to that data is permitted for those other than the owner.

Also, the access control information (ACL) is attached to each process, where this access control information (ACL) indicates IDs of other processes which can be a transfer source. In addition, this access control information (ACL) may also include supplementary information as to what type of access can be permitted.

In a case of a data transfer between processes, when a mapping between the virtual pages and physical pages is to be changed, the access control information (ACL) of the process owning the transfer destination virtual space and the access control information (aclb) of the physical page are compared, and when the registered process IDs coincide, the mapping is permitted. When the supplementary information is attached, a comparison of the supplementary information is also made and reflected in the judgement as to whether or not to permit the above mapping.

When the mapping is permitted, that physical page is mapped onto the virtual space owned by the transfer destination process.

The access control information check unit 208 is a unit which compares the access control information (ACL) contained in the process management data 207 with the access control information (aclb) corresponding to the transfer data, and judges whether the data transfer is permitted or not.

The page table 203 is constructed from page table entries which register information such as physical page numbers, using virtual page numbers as indexes as already mentioned above.

The page table management unit 211 is a unit for managing the page table 203. This page table management unit 211 rewrites the page table 203 when it is judged that the data transfer is permitted.

The TLB 213 is a unit in which the page table entries of the page table 203 are to be cached.

The data read/write control unit 212 is a unit for controlling the read/write operation of data from/to the memory 190 by the process execution unit 209, so as to accept a data region transfer request from a process or the OS.

The address translation unit 214 is a unit for carrying out a translation from the virtual address to the physical address.

The set of small data memory regions 206 are allocated in the memory 190 at a time of activation of the OS in a prescribed size and for a prescribed number, and used to store packet headers or small packets. The transfer data from which the packet header is removed will be stored in the physical page 205.

In the above described configuration, when one process transfers data stored in the physical page corresponding to the virtual page in the virtual space of this process to another process, the transfer source process transmits the data transfer request from the process execution unit 209 first.

When the data transfer request is received, the data read/write control unit 212 requests the access control information check unit 208 to compare the access control information (aclb) corresponding to the physical page in which the transfer data is stored, with the access control information (ACL) of the data transfer that can be accepted by the transfer destination process.

The access control information check unit 208 compares the access control information (aclb) and access control information (ACL), and when the data transfer is permitted as a result of this comparison, the access control information check unit 208 requests the page table management unit 211 to change the mapping between the virtual pages and the physical pages 205.

When the change of the mapping is requested, the page table management unit 211 deletes the physical page number registered in the page table entry corresponding to the virtual page in the virtual space of the transfer source process, so that the transfer source process cannot access that physical page, while also registering that physical page number into the page table entry corresponding to the virtual page allocated for the transfer data, so that the transfer destination process can access that physical page. On the other hand, when the data transfer is not permitted as a result of the above comparison, the access control information check unit 208 or the data read/write control unit 212 notifies a failure of the data transfer to the transfer source process.

Next, an exemplary data transfer between processes in this second embodiment which utilizes an intermediate state in which the physical page storing the transfer data does not correspond to the virtual page will be described.

Figure 20:
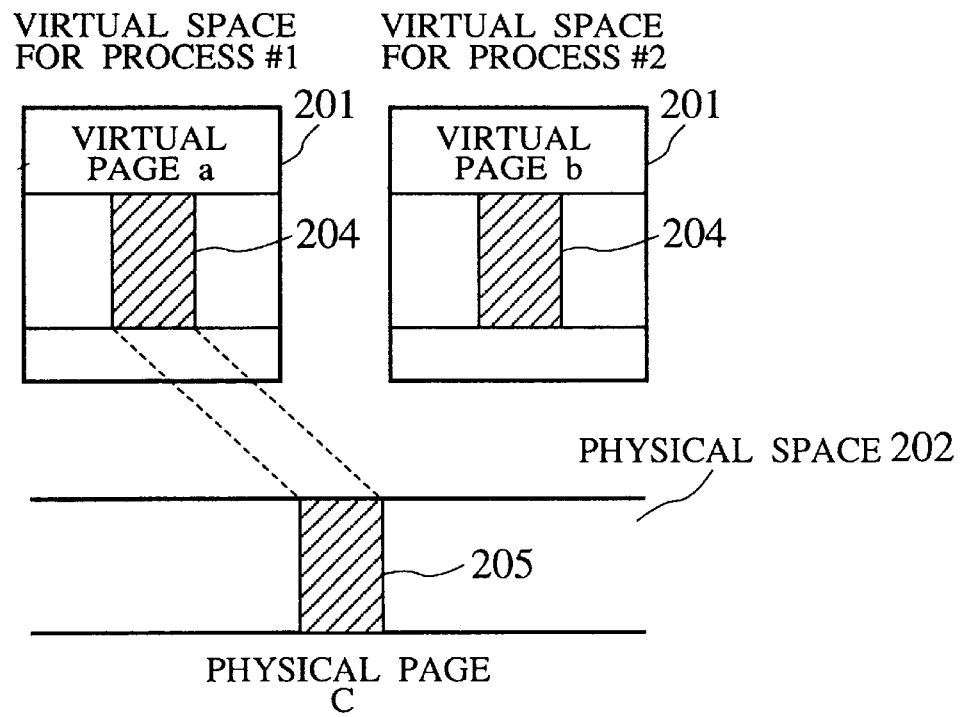
FIG. 20 is a diagram illustrating an exemplary mapping between virtual pages and physical pages in an initial state according to the second embodiment of the present invention.
Figure 21:
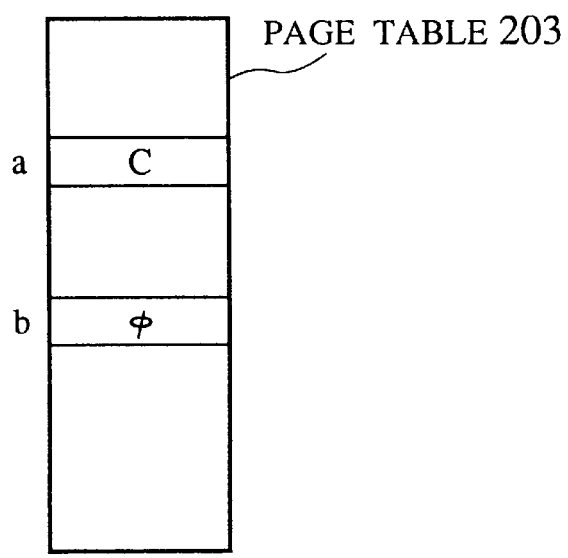
FIG. 21 is a diagram illustrating an exemplary state of a page table corresponding to the mapping of FIG. 20.

(1) Initial State:

FIG. 20 shows an initial state of the mapping between the virtual page 204 and the physical page 205 at a beginning of the data transfer, while FIG. 21 shows a corresponding initial state of the page table 203 at that time.

In FIG. 20, the physical page C storing the transfer data is mapped onto the virtual page "a" in the virtual space of the transfer source process, and no physical page is mapped onto the virtual page "b" of the transfer destination process which is to be used for the data transfer or other purposes.

Also, FIG. 21 shows the page table 203 in this state, where the physical page number C is registered in the PTE corresponding to the virtual page number "a" while no physical page number is registered in the PTE corresponding to the virtual page number "b" as indicated by the symbol "O".

Now, in this initial state, suppose that the transfer source process requested the OS to transfer the data stored in the physical page C to the transfer destination process or the virtual space of the transfer destination process.

In this case, the OS compares the access control information (aclb) corresponding to the physical page storing the transfer data and the access control information (ACL) of the data transfer that can be admitted by the transfer destination process or virtual space, and when the data transfer is permitted as a result of this comparison, a transition to the intermediate state to be described below is made.

When the data transfer is not permitted, the OS reports a failure of the data transfer to the transfer source process, and carries out a necessary error processing.

Figure 22:
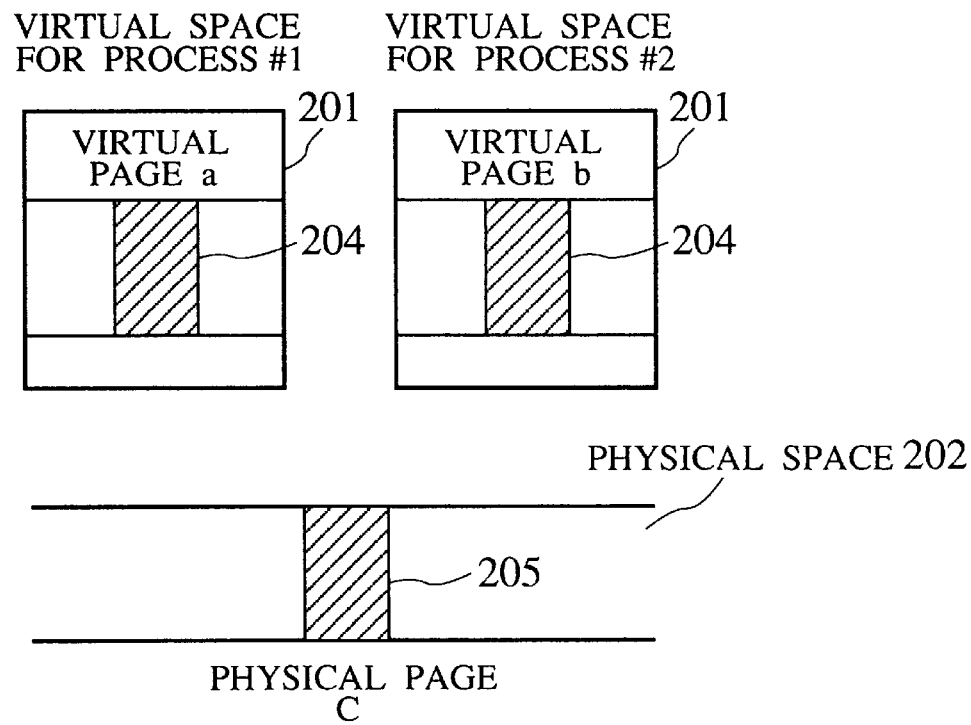
FIG. 22 is a diagram illustrating an exemplary mapping between virtual pages and physical pages in an intermediate state according to the second embodiment of the present invention.
Figure 23:
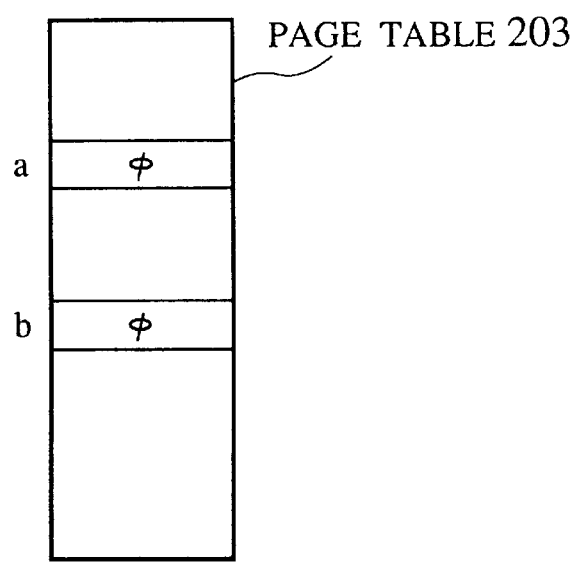
FIG. 23 is a diagram illustrating an exemplary state of a page table corresponding to the mapping of FIG. 22.

(2)Intermediate State:

FIG. 22 shows an intermediate state of the mapping between the virtual page 204 and the physical page 205 in a course of the data transfer, while FIG. 23 shows a corresponding intermediate state of the page table 203 at that time.

When the data transfer is permitted by the transfer destination process, the mapping between the virtual page "a" in the virtual space 201 of the transfer source process and the physical page C storing the transfer data is released, and a transition to the intermediate state is made. In this case, the physical page number registered in the PTE corresponding to the virtual page number "a" is cleared in the page table 203 as shown in FIG. 23.

By making a transition to this intermediate state in which the physical page storing the transfer data does not correspond to either the virtual page of the transfer source process or the virtual page of the transfer destination process, it is possible to eliminate a possibility for this transfer data to be accessed at critical timing from the transfer source process or the transfer destination process.

Also, by providing this intermediate state, it becomes possible to deal with a case in which the physical page cannot be mapped onto the virtual page as the virtual page allocated for the transfer data in the virtual space of the transfer destination process happens to be currently used by the transfer destination process.

Figure 24:
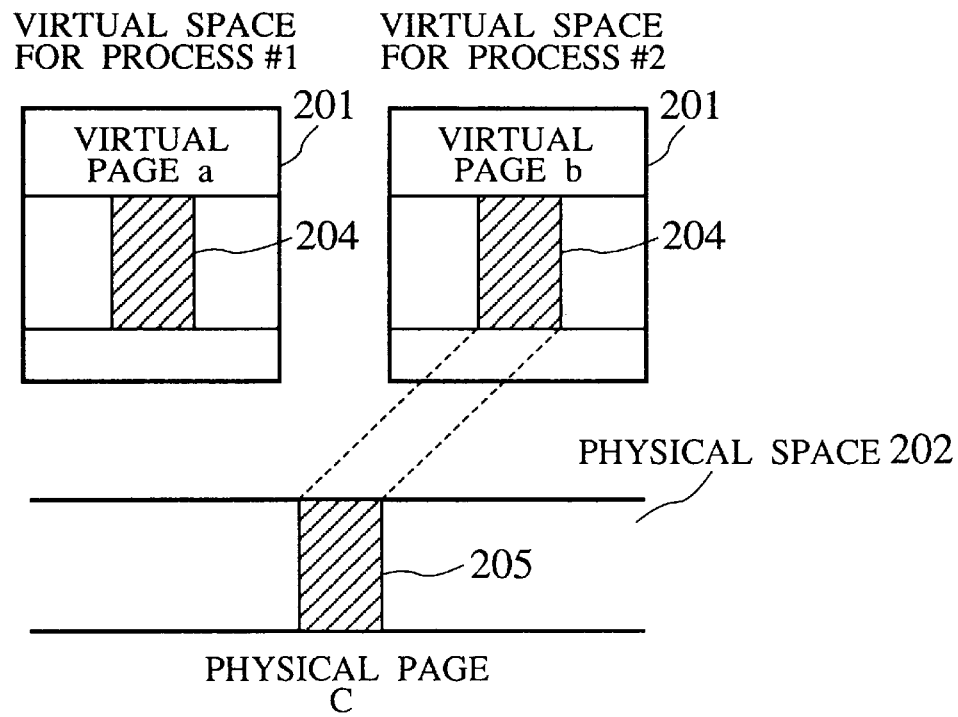
FIG. 24 is a diagram illustrating an exemplary mapping between virtual pages and physical pages in a final state according to the second embodiment of the present invention.
Figure 25:
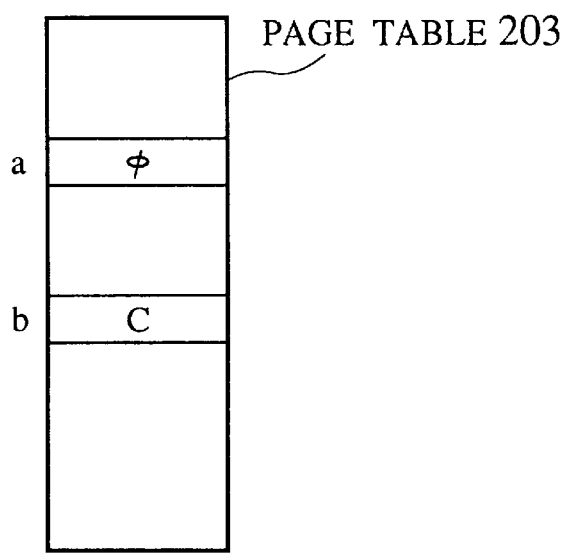
FIG. 25 is a diagram illustrating an exemplary state of a page table corresponding to the mapping of FIG. 24.

(3)Final State:

FIG. 24 shows a final state of the mapping between the virtual page 204 and the physical page 205 at an end of the data transfer, while FIG. 25 shows a corresponding final state of the page table 203 at that time.

By means of fan explicit request for mapping between the physical page storing the transfer data and the virtual page provided for the transfer data from the transfer destination process such as an execution of a read/write system call, the physical page is mapped onto the virtual page so as to make a transition from the intermediate state to the final state. In this case, the physical page number registered in the PTE corresponding to the virtual page number "b" is rewritten from the cleared (O) to the physical page number C storing the transfer data in the page table 203 as shown in FIG. 25.

Note that, although a case in which the physical page storing the transfer data is only one page has been described above, the same procedure also applies to a casein which a plurality of physical pages store the transfer data.

It is preferable for the transfer data to start from a top of the physical page, but this may not necessarily be the case and the transfer data may start from a middle of the physical page. In such a case, the change of the mapping between the virtual page and the physical page must be taken into consideration for the data in a region from a top of the physical page up to a start of the transfer data. Also, the end of the transfer data may not necessarily be at an end of a page so that the transfer data may end in a middle of a page.

Note also that, although a case in which the comparison of the access control information is made between the initial state and the intermediate state has been described above, it is also possible to make a transition to the intermediate state first and then carry out the comparison of the access control information. Also, when the data transfer is permitted, a transition to the intermediate state is made in the above, but it is also possible to make a transition to the final state directly, without going through the intermediate state.

Next, an exemplary method for managing the above described intermediate state will be described.

Figure 26:
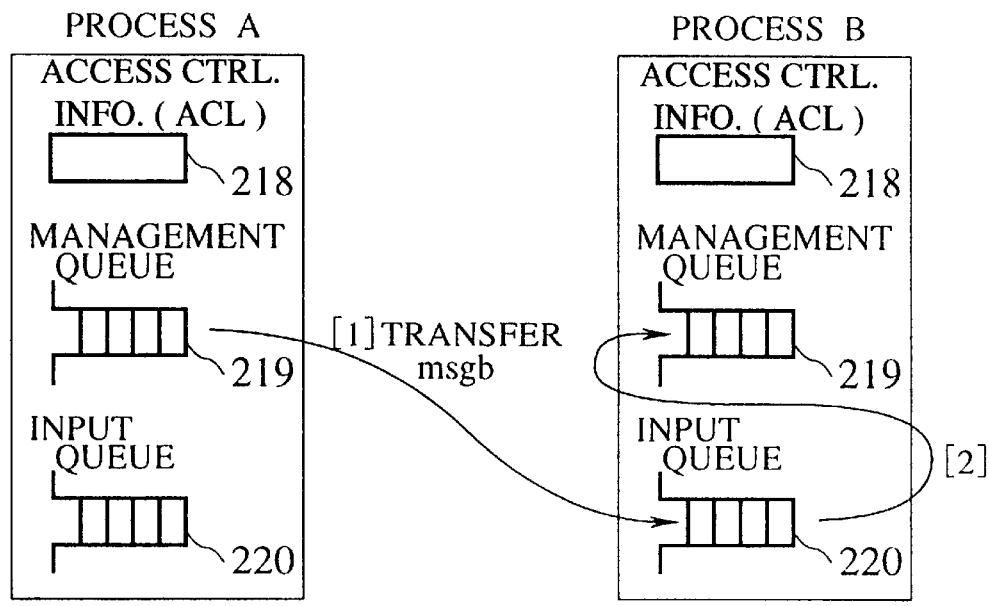
FIG. 26 is a diagram illustrating an exemplary scheme for managing an intermediate state according to the second embodiment of the present invention.

FIG. 26 shows an exemplary process configuration which can manage the intermediate state. In FIG. 26, the process configuration includes an access control information (ACL) 218 in which the access control information of the data transfer that can be accepted by the process or the virtual space of the process is written, a management queue 219 for managing message block msgb corresponding to the physical page which is mapped onto the virtual page in the virtual space of the process by means of a queue structure, and an input queue 220 which is a kind of event queue for managing message block msgb corresponding to the data transfer accepted by the processor the virtual space of the process by means of a queue configuration. Note that this process structure shown in FIG. 26 is to be provided inside the process management data 207 shown in FIG. 19.

Figure 27:
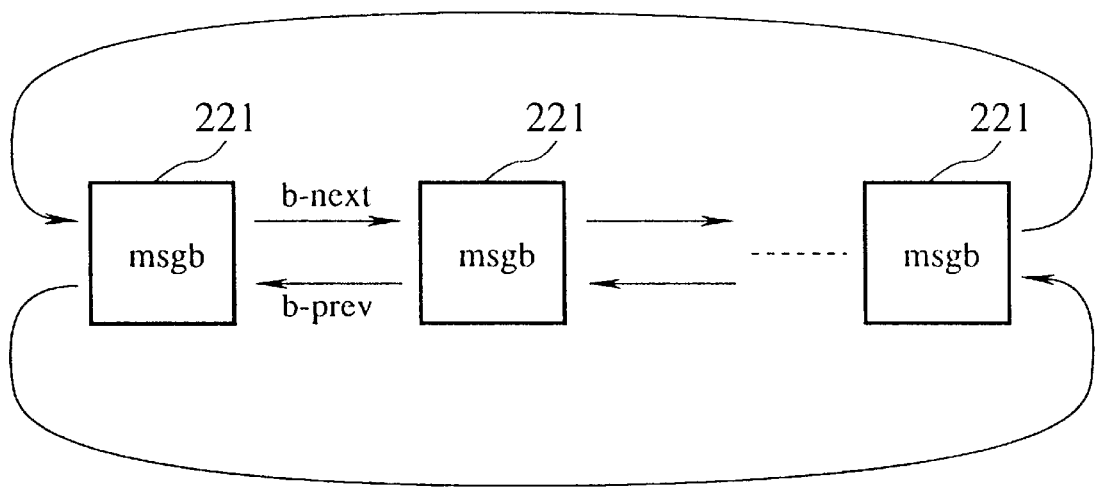
FIG. 27 is a diagram illustrating an exemplary linked list for forming each of a management queue and an input queue shown in FIG. 26.
Figure 28:
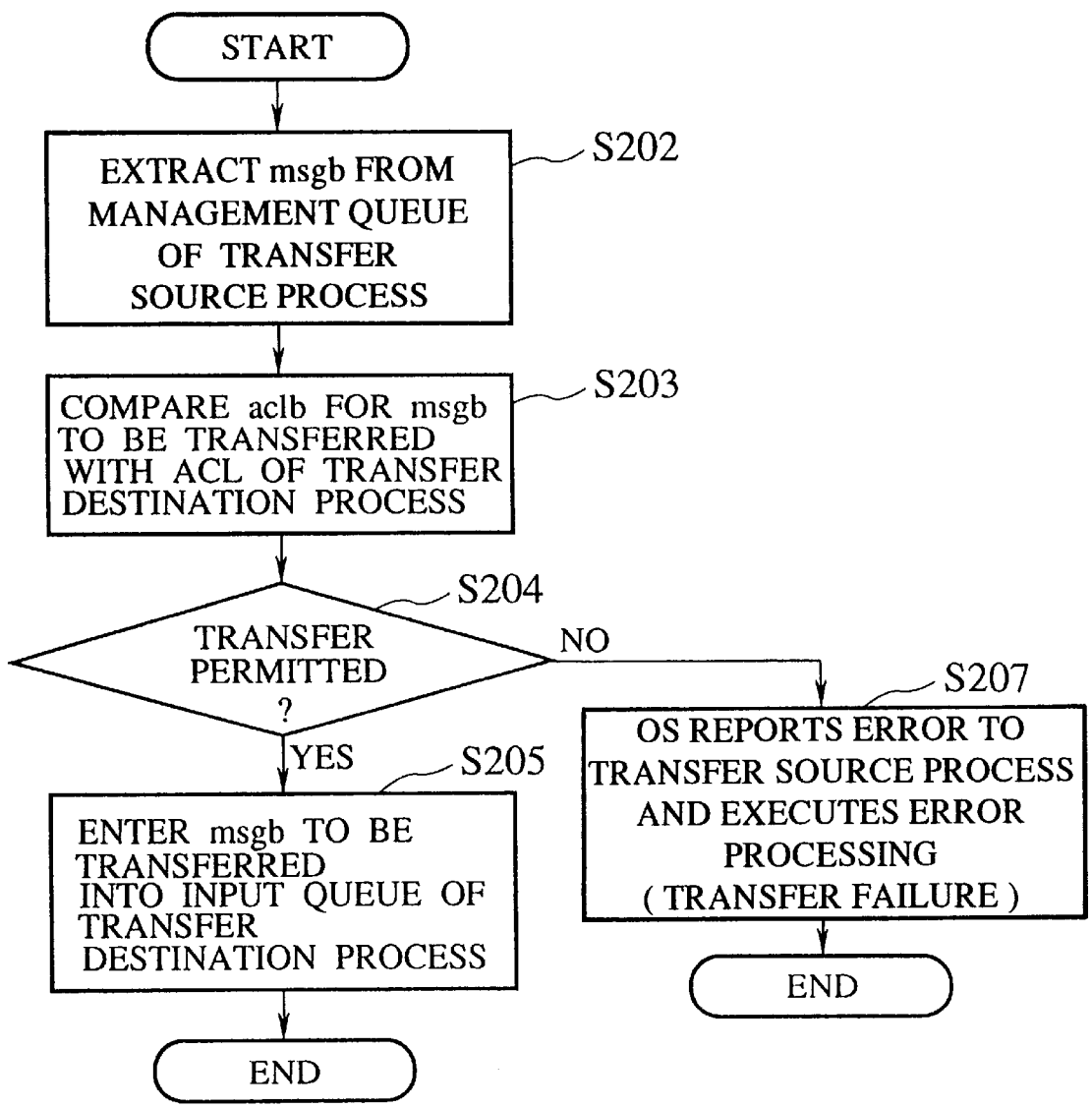
FIG. 28 is a flow chart for a procedure to make a transition from an initial state to an intermediate state according to the exemplary scheme illustrated in FIG. 26.
Figure 29:
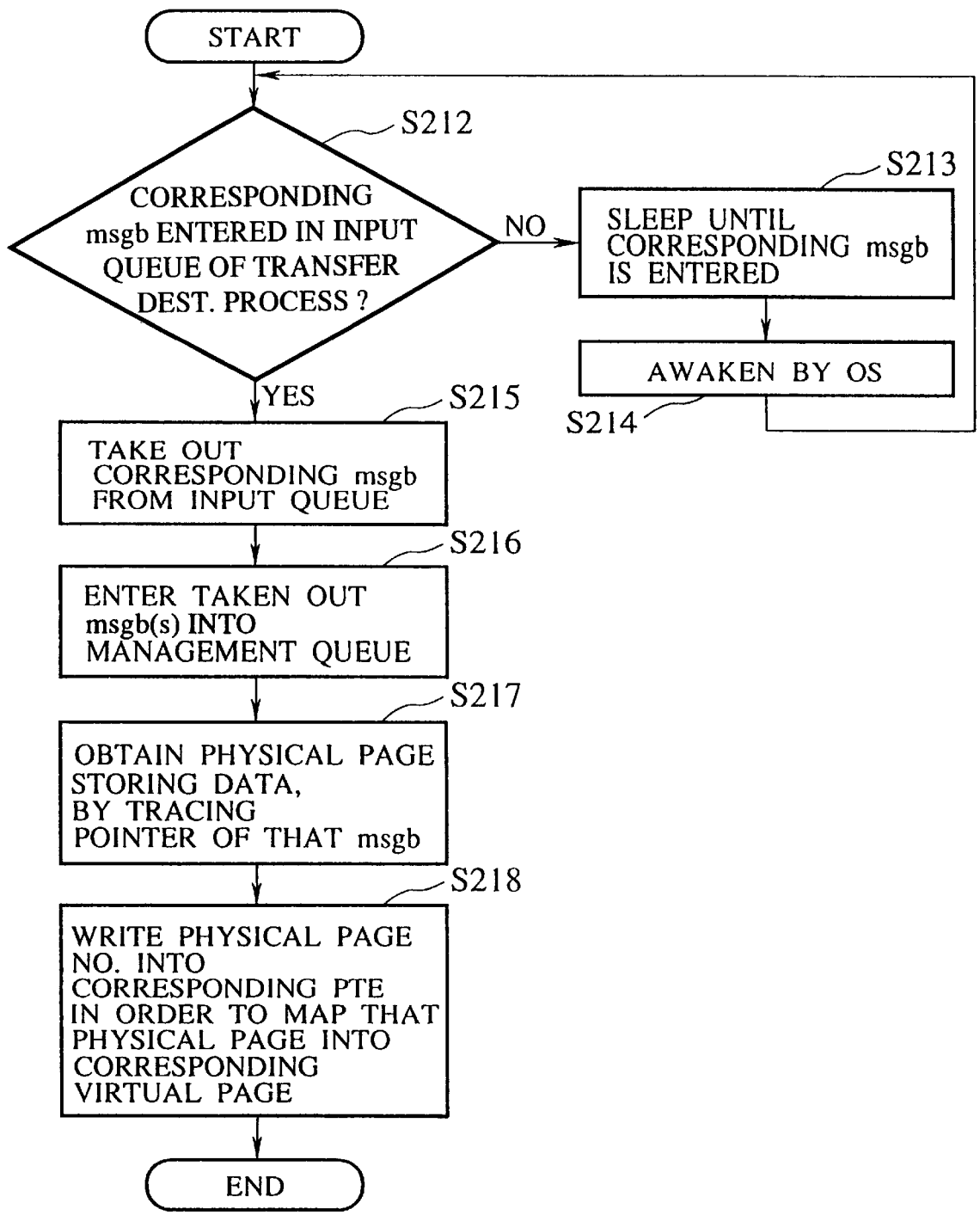
FIG. 29 is a flow chart for a procedure to make a transition from an intermediate state to a final state according to the exemplary scheme illustrated in FIG. 26.

Each of the management queue 219 and the input queue 220 may be formed by a linked list which links message block msgb 221 by double links as shown in FIG. 27, or by a linked list which links msgb 221 by a single link.

The advantage of a queue formed by the double links i˜ that a queuing element can be taken out not just from a top of the queue but also from a middle of the queue, so that when a queuing element with a high priority is entered, this queuing element can be taken out from a middle of the queue instead of a top of the queue.

Also, when the transfer data are stored over a plurality of physical pages, data block datb and message block msgb are in correspondence for each physical page, and when message block msgb corresponding to the data transfer as described above is to be entered into the input queue 220 or the management queue 219, all message block msgb corresponding to that data transfer may be entered into the queue, or only a top message block msgb among all message block msgb corresponding to that data transfer may be entered into the queue.

Also, the structure for managing packets is divided into message block msgb and data block datb in the above, but packets may be managed by a single structure.

Note that the reason for managing packets by two structures in this second embodiment is that the identical data such as a packet header can be easily shared by two packets. In such a case, two message block msgb are used to point to one data block datb.

Also, in a case of writing data for a part of a packet which is shared by two packets, only with respect to one of these two packets, it is possible to realize the so called COW (Copy On Write) in which the sharing is released, data of that part is copied to another region, and the writing is made with respect to data for which the copying is finished.

Next, a case of making a transition from the initial state of the data transfer shown in FIG. 20 to the intermediate state of the data transfer shown in FIG. 22 by using the process structure shown in FIG. 26 will be described. In this case, the operation procedure is as shown in the flow chart of FIG. 28.

First, when the data transfer is requested, the OS takes (extracts) the message block msgb 221 corresponding to the physical page storing the transfer data from the management queue 219 of the transfer source process (step S202). Then, the OS compares the access control information aclb corresponding to the message block msgb 221 and the ALC 218 in which the access control information of the data transfer that can be admitted by the transfer destination process is written (step S203). When the data transfer is permitted (step S204 YES), the OS enters the message block msgb 221 into the input queue of the transfer destination process (step S205), whereas when the data transfer is not permitted (step S204 NO), the OS reports an error to the transfer source process, and executes an assigned error processing (step S207).

In this exemplary case, the change of the mapping between the virtual page and the physical page may be made at a time of taking out the message block msgb 221 from the management queue 219 of the transfer source process. Next, a case of making a transition from the intermediate state of the data transfer shown in FIG. 22 to the final state of the data transfer shown in FIG. 24 by using the process structure shown in FIG. 26 will be described. In this case, the operation procedure is as shown in the flow chart of FIG. 29.

Suppose that the transfer destination process executed the read system call with respect to the virtual page allocated to the data transfer.

Also, at a time of execution of the read system call with respect to the virtual page allocated to the data transfer, if a physical page is mapped onto that virtual page, it is assumed that this map is released, and the physical page storing the transfer data which is newly received by the transfer destination process is going to be mapped onto that virtual page.

In this case, when the execution of the read system call is requested, the OS checks whether the message block msgb 221 corresponding to the data transfer of that virtual page is already entered in the input queue 220 of the transfer destination process (step S212).

When the message block msgb 221 is not already entered in the queue (step S212 NO), the transfer destination process is put to sleep until the corresponding message block msgb is entered (step S213) and this process is awakened by the OS (step S214).

On the other hand, when the corresponding message block msgb 221 has already been entered in the queue (step S212 YES), as many of the message block msgb 221 as can be mapped onto the virtual page allocated to the data transfer among the corresponding message block msgb 221 are taken out from the input queue 220 (step S215), and then entered into the management queue 219 (step S216).

Then, by tracing the pointer of the message block msgb 221 entered in the management queue 219, the physical page corresponding to that message block msgb 221 is obtained (step S217), and in order to map this physical page to the virtual page allocated to the data transfer, the physical page number of that physical page is written into the PTE corresponding to that virtual page (step S218). The execution of the read system call is then finished.

Now, an exemplary case of transferring a packet received from a network to a transfer destination process or a virtual space of a transfer destination process on a host according to this second embodiment will be described with references to FIG. 30 and FIG. 31.

The mapping between the virtual pages and the physical pages is to be changed for the purpose of the data transfer in this second embodiment, but if the received packet is stored from a top of the physical page, the transfer data contained in the received packet would start from a middle of the virtual page rather than a top of the virtual page because of the presence of a header at a top of the packet.

In this regard, a top of the physical page and a top of the transfer data can be aligned in the following manner.

Figure 30:
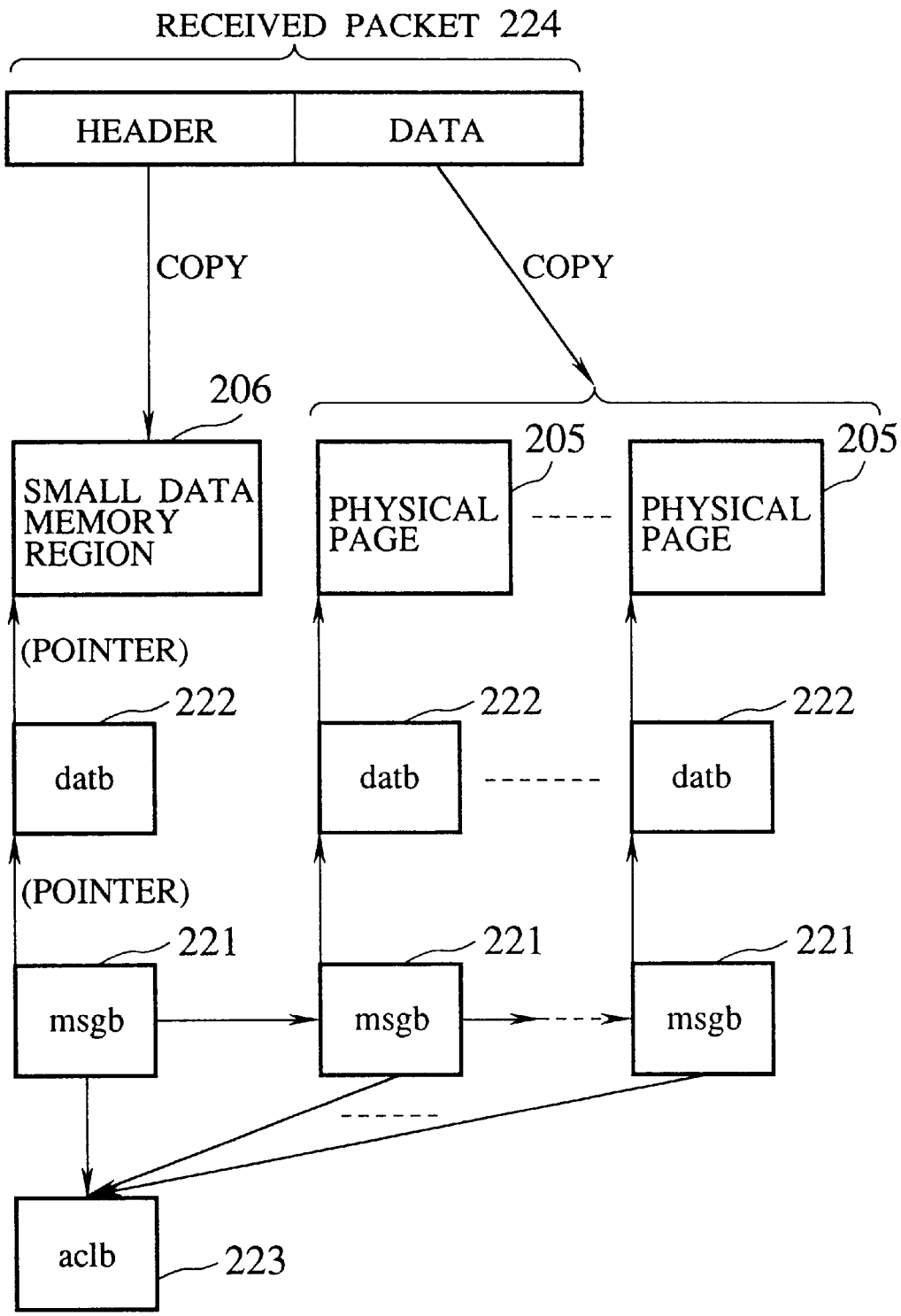
FIG. 30 is a diagram how to transfer transferring a packet according to the second embodiment of the present invention.

First, the actual memory for storing the received packet 224, etc., is managed in the form of small data memory regions 206 for storing smaller data such as a header, and the physical pages 205 for storing data in larger sizes such as the transfer data, as shown in FIG. 30. Note here that the allocation of the small data memory regions 206 and the physical pages 205 can be made at a time of activation of the system, or during the system operation dynamically. Moreover, both of these schemes may be used at the same time.

Figure 31:
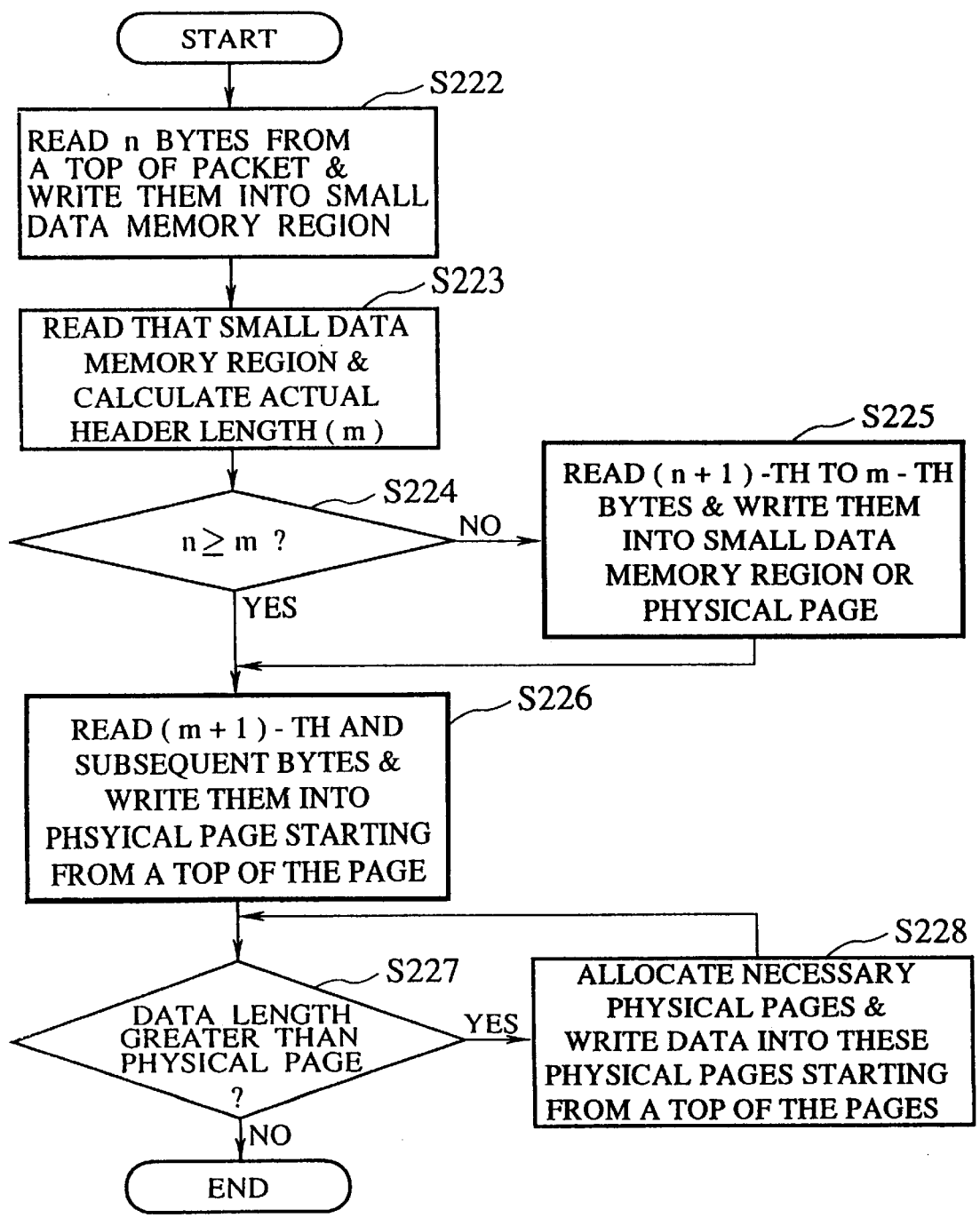
FIG. 31 is a flow chart for a procedure to transfer a packet according to the exemplary manner illustrated in FIG. 30.

Then, the procedure according to the flow chart of FIG. 31 is carried out as follows.

When the packet is transferred from the network and received at a buffer on the network interface, the OS reads data in a prescribed size (which is assumed to be n bytes) from a top of the packet and writes the data into the small memory region 206 on the actual memory (step S222). Here, a value of n is assigned such that the n bytes region from a top of the packet contains information such as that of a header length of a packet which is contained in the header of the packet.

Then, the network module inside the OS calculates the actual header length according to the header length information stored in the small memory region (step S223). Here, the header length obtained by this calculation is assumed to be m bytes.

When m is greater than n (step S224 NO), it is a case in which there is some remaining data that are not yet read from the buffer on the network interface to the actual memory. In this case, (n+1)-th to m-th bytes are read out and transferred to that small data memory region 206 or another small data memory region 206, or else the physical page 205 (step S225). When m is not greater than n (step S224 YES), this step S225 is skipped.

Then, (m+1)-th and subsequent bytes are read out and transferred from the buffer to the actual memory, such that the (m+1)-th byte at which the transfer data starts in the received packet is aligned with a top of the physical page (step S226).

When the data length is greater than the physical page so that the transfer data contained in the received packet cannot be stored in one physical page (step S227 YES), as many as necessary physical pages starting from a top are allocated and the transfer data are stored in these physical pages (step S228).

In this manner, the transfer data contained in the received packet is stored into the physical page with a top of the transfer data aligned with a top of the physical page, so that a top of the transfer data and a top of the virtual page can be aligned at a time of the mapping of the physical page onto the virtual page in the virtual space of the transfer destination process.

In addition, by aligning a top of the physical page to a top of the transfer data in this manner, when the mapping between the virtual page and the physical page is changed and the transfer destination process makes an access to the transfer data through the virtual page, it becomes possible to make an access to the transfer data starting from a top of the virtual page.

Now, a manner of producing a packet from data owned by a user process and transmitting a produced packet to a network according to the data transfer method of this second embodiment will be described.

First, when the user process requests the OS to transmit data by using the write system call, according to the scheme described above with references to FIG. 26 to FIG. 29, the message control msgb corresponding to that data is entered into the management queue 219 via the input queue 220 of the OS from the management queue 219 of the user process, while the mapping of the physical page corresponding to that data is changed from the virtual page in the virtual space of the user process to the virtual page in the virtual space of the OS Then, Then the network module inside the OS makes an access to that data by making an access to that virtual page, produces an information on a header, etc., for that data, and transfers that data along with the produced information on a header, etc., to the buffer on the network interface board.

Then, the network interface calculates data to be used for a transfer error detection by a receiver, for the header and the data transferred to the buffer, and produces a packet from these three parts (transfer data, header, and transfer error detection data) and transmits the produced packet to the network.

As described, in order to produce the transmission packet according to the data owned by the user process and transmit this transmission packet to the network, it suffices to change the mapping between the physical page storing the transfer data and the virtual page contained in the virtual space owned by the user process to the mapping between that physical page and the virtual page in the virtual space of the OS, and then produce the header for the transfer data and transfer the produced header along with the transfer data to the network interface at the OS, so that the data transfer required in the processing at the transmitting side only includes a change of the mapping between the virtual page and the physical page once and an actual data transfer once, and therefore the data transfer can be realized efficiently in this second embodiment.

Note that the calculation of data to be used for a transfer error detection by a receiver is carried out at the network interface board in the above, but in a case of carrying out this calculation at the network module inside the OS (i.e., by means of software in the processor), one additional data transfer will be necessary in order to transfer data to the processor.

Now, a manner of transferring a received packet from a network to a transfer destination process on a receiving host according to the data transfer method of this second embodiment will be described.

First, the packet transferred from the network is stored in the buffer on the network interface, and whether there is a transfer error or not is checked by a transfer error detection unit provided in the network interface. The packet for which a transfer error is not detected is then transferred from the buffer to the physical page corresponding to the virtual page allocated for storing the transfer data of the OS, according to the scheme described above with references to FIG. 30 and FIG. 31.

After the necessary protocol processing is applied to the received packet transferred to the physical page by the network module inside the OS, according to the scheme described above with references to FIG. 26 to FIG. 29, the message block msgb corresponding to the physical page is entered into the management queue via the input queue of the transfer destination process from the management queue of the OS, while the mapping of that physical page is changed from the virtual page in the virtual space of the OS to the virtual page in the virtual space of that transfer destination process.

As described, in order to extract the transfer data from the received packet from the network and transfer the extracted transfer data to the virtual space of the transfer destination process, it suffices to transfer the transfer data from the network interface storing the received packet to the physical page corresponding to the virtual page in the virtual space of the OS, and then change the mapping to make this physical page mapped onto . . . the virtual page in the virtual space of the transfer destination process, so that the data transfer required in the processing at the receiving side only includes an actual data transfer once and a change of the mapping between the virtual page and the physical page once, and therefore the data transfer can be realized efficiently in this second embodiment.

Note that the detection of a transfer error is carried out at the network interface in the above, but it is also possible to carry out this detection of a transfer error at the network module inside the OS (i.e., by means of software in the processor). In such a case, however, one additional data transfer will be necessary in order to transfer data to the processor.

Also, in a case where the processing power for the detection of a transfer error on the network interface is higher than the processing power for the detection of a transfer error inside the OS, it is possible to reduce the processing for the detection of a transfer error to be carried out inside the OS by using information on the detection of a transfer error obtained on the network interface.

In such a case, it is also possible to transfer that information to the network module inside the OS by using information of access control information aclb. Also, in such a case, it is possible to reduce the processing for error detection/correction to be carried out inside the OS by registering information on the error detection/correction obtained on the network interface into the information of access control information aclb.

For example, in the ATM (Asynchronous Transfer Mode), for a packet to which the CRC (Cyclic Redundancy Check) of AAL (ATM Adaptation Layer) 5 was made on the network interface, an information indicating that the CRC was made can be registered in access control information aclb, so that the OS can omit the error detection processing such as the checksum calculation which is to be carried out at an upper layer, and the OS only carries out the packet length check as the upper layer error detection processing.

It is to be noted that the second embodiment has been described above for a case using the access control information (ACL) which indicates data transfer that can be admitted by a transfer destination process (e.g., an identifier of a transfer source process from which data transfer can be admitted by a transfer destination process), and the access control information (aclb) for transfer data stored in a physical page which indicates a process from which the data transfer of this transfer data is allowed. However, it is possible to modify this second embodiment in such a manner that the access control information (ACL) indicates data transfer that can be admitted by a transfer source process (e.g., an identifier of a transfer destination process to which data transfer can be admitted by a transfer source process), and the access control information (aclb) for transfer data stored in a physical page indicates a process to which the data transfer of this transfer data is allowed. The operation of the second embodiment as described above substantially remains unchanged in such a modified case, and the same effects as described above can also be realized in such a modified case.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method for directly transferring data from a transfer source device interface of a computer system to a transfer destination element of the computer system, the transfer destination element being any one of a user space, a buffer memory and a device interface, the method comprising the steps of:

referring to an access control information provided in a kernel space of the computer system, the access control information indicating a permitted access with respect to one data block of the transfer source device interface; and controlling a transfer of said one data block according to the access control information referred at the referring step.

2. The method of claim 1, wherein at the referring step the computer system refers to the access control information which indicates the permitted access by specifying an identifier of any program execution unit in the computer system which is permitted to make an access to said one data block, such that a required access to said one data block necessary in executing the transfer of data is permitted when the transfer from the transfer source device interface to the transfer destination element is caused by a processing carried out by a program execution unit whose identifier is specified by the access control information, the program execution unit being an element for carrying out a processing by making accesses to data blocks.

3. The method of claim 1, wherein at the controlling step the computer system controls the transfer of data by judging whether a required access to said one data block necessary in executing the transfer of data is permitted or not according to the access control information, and executing the transfer of data when the required access is judged as permitted.

4. A method for directly transferring data from a transfer source device interface of a computer system to a transfer destination element of the computer system, the transfer destination element being any one of a user space, a frame buffer and a device interface, the method comprising the steps of:

referring to a first access control information and a second access control information provided in a kernel space of the computer system, the first access control information indicating a permitted access with respect to a first data block of the transfer source device interface, and the second access control information indicating a permitted access with respect to a second data block of the transfer destination element; and controlling a transfer of data from the first data block to the second data block according to the first access control information and the second access control information referred at the referring step.

5. The method of claim 4, wherein at the referring step the computer system refers to the first access control information which indicates the permitted access by specifying an identifier of any program execution unit in the computer system which is permitted to make an access to the first data block, and the second access control information which indicates the permitted access by specifying an identifier of any program execution unit in the computer system which is permitted to make an access to the second data block, such that required accesses to the first data block and the second data block necessary in executing the transfer of data are permitted when the transfer from the transfer source device interface to the transfer destination element is caused by a processing carried out by a program execution unit whose identifier is specified by the first access control information and the second access control information, the program execution unit being an element for carrying out a processing by making accesses to data blocks.

6. The method of claim 4, wherein at the controlling step the computer system controls the transfer of data by judging whether required accesses to the first data block and the second data block necessary in executing the transfer of data are permitted or not according to the first access control information and the second access control information, and executing the transfer of data when the required accesses are judged as permitted.

7. A method for directly transferring data from a transfer source element of a computer system to a transfer destination device interface of the computer system, the transfer source element being any one of a user space, a frame buffer and a device interface, the method comprising the steps of:

referring to a first access control information and a second access control information provided in a kernel space of the computer system, the first access control information indicating a permitted access with respect to a first data block of the transfer source element, and the second access control information indicating a permitted access with respect to a second data block of the transfer destination device interface; and controlling a transfer of data from the first data block to the second data block according to the first access control information and the second access control information referred at the referring step.

8. The method of claim 7, wherein at the referring step the computer system refers to the first access control information which indicates the permitted access by specifying an identifier of any program execution unit in the computer system which is permitted to make an access to the first data block, and the second access control information which indicates the permitted access by specifying an identifier of any program execution unit in the computer system which is permitted to make an access to the second data block, such that required accesses to the first data block and the second data block necessary in executing the transfer of data are permitted when the transfer from the transfer source element to the transfer destination device interface is caused by a processing carried out by a program execution unit whose identifier is specified by the final access control information and the second access control information, the program execution unit being an element for carrying out a processing by making accesses to data blocks.

9. The method of claim 7, wherein at the controlling step the computer system controls the transfer of data by judging whether required accesses to the first data block and the second data block necessary in executing the transfer of data are permitted or not according to the first access control information and the second access control information, and executing the transfer of data when the required accesses are judged as permitted.

10. A memory management system associated with a computer system, comprising:

a memory for storing each data block of an element of the computer system, and an access control information which indicates a permitted access with respect to each data block, in correspondence, said element being any one of a user space, a frame buffer and a device interface; and a control unit for controlling access to a requested data block of said element, according to an identifier of an access requesting source which requested an access to said requested data block, and the access control information stored in the memory in correspondence to said requested data block.

11. The system of claim 10, wherein the memory stores the access control information which indicates the permitted access by specifying an identifier of any program execution unit in the computer system which is permitted to make an access to said each data block, such that the access to said requested data block is permitted when the access is requested by the access requesting source which is a program execution unit whose identifier is specified by the access control information, the program execution unit being an element for carrying out a processing by making accesses to data blocks.

12. The system of claim 10, wherein the control unit controls access by judging whether a requested access to said requested data block is permitted or not according to the identifier of the access requesting source and the access control information, and executing the requested access when the requested access is judged as permitted.

13. A method for transferring data between processes in a computer system, comprising the steps of:

referring to an access control information indicating a permitted access with respect to a requested physical page storing a transfer data; and controlling a transfer of the transfer data by changing a mapping between said requested physical page and a virtual page from a previous mapping between said requested physical page and a virtual page according to the access control information referred at the referring step.

14. The method of claim 13, wherein the referring step is carried out at a time of entering an information for specifying the physical page into an input queue provided for a transfer destination process, and at the controlling step the computer system controls the transfer by judging whether the transfer to the transfer destination process is permitted or not according to the access control information.

15. The method of claim 13, wherein the transfer data is contained in a packet having a header provided at a top of the packet, and the method further comprises the step of:

storing the transfer data into the physical page, by reading data in a prescribed range from a top of the packet including a header length information, determining a top position of the transfer data in the packet according to the header length information, and aligning the determined top position of the transfer data to a top of the physical page.

16. The method of claim 13, wherein at the referring step the computer system refers to the access control information which indicates the permitted access by specifying an identifier of a process which is permitted to make an access to the physical page.

17. The method of claim 13, wherein at the controlling step the computer system controls the transfer of the transfer data by judging whether a required access to said requested physical page necessary in executing the transfer of the transfer data is permitted or not according to the access control information, and executes the transfer of the transfer data by changing the mapping between said requested physical page and a virtual page when the required access is judged as permitted.

18. A memory management system, comprising:

a memory for storing each physical page and an access control information indicating a permitted access with respect to each physical page, in correspondence; and a control unit for controlling access to a requested physical page by changing a mapping between said requested physical page and a virtual page from a previous mapping between said requested physical page and a virtual page according to the access control information stored in the memory in correspondence to said requested physical page, and at least one of an identifier of a transfer source process and an identifier of a transfer destination process.

19. The system of claim 18, wherein the memory stores the access control information which indicates the permitted access by specifying an identifier of a process which is permitted to make an access to each physical page.

20. The system of claim 18, wherein the control unit controls the access by judging whether a requested access to said requested physical page is permitted or not according to the access control information and said at least one of the identifier of the transfer source process and the identifier of the transfer destination process, and executes the requested access when the requested access is judged as permitted.

* * * * *